(12) United States Patent
Ogawa et al.

(10) Patent No.: US 6,243,069 B1
(45) Date of Patent: Jun. 5, 2001

(54) LIQUID CRYSTAL DISPLAY WITH IMAGE READING FUNCTION, IMAGE READING METHOD AND MANUFACTURING METHOD

(75) Inventors: Kazufumi Ogawa, Nara; Shinzaburo Ishikawa, Hirakata; Takashi Okada, Shijonawate; Yoshinao Taketomi, Kyotanabe, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/202,718

(22) PCT Filed: Apr. 22, 1998

(86) PCT No.: PCT/JP98/01829

§ 371 Date: Feb. 18, 1999

§ 102(e) Date: Feb. 18, 1999

(87) PCT Pub. No.: WO98/48322

PCT Pub. Date: Oct. 29, 1998

(30) Foreign Application Priority Data

Apr. 22, 1997 (JP) .................................................. 9-104344

(51) Int. Cl.⁷ ...................................................... G09G 3/36
(52) U.S. Cl. ............................. 345/102; 345/88; 345/207
(58) Field of Search ................................. 345/87, 88, 89, 345/102, 98, 100, 173, 179, 180, 181, 182, 103, 207, 90, 92, 93

(56) References Cited

U.S. PATENT DOCUMENTS

| | | | |
|---|---|---|---|
| 5,128,782 | * | 7/1992 | Wood ..................................... 349/61 |
| 5,225,823 | * | 7/1993 | Kanaly ..................................... 345/89 |
| 5,337,068 | * | 8/1994 | Stewart et al. .......................... 345/88 |
| 5,416,496 | * | 5/1995 | Wood ..................................... 345/102 |
| 5,977,942 | * | 11/1999 | Walker et al. .......................... 345/97 |

FOREIGN PATENT DOCUMENTS

| | | |
|---|---|---|
| 0 587 236 A2 | 3/1994 | (EP) . |
| 62-44796 | 2/1987 | (JP) . |
| 2-15238 | 1/1990 | (JP) . |
| 2-130521 | 5/1990 | (JP) . |
| 3-113960 | 5/1991 | (JP) . |
| 4-183062 | 6/1992 | (JP) . |
| 4-28209 | 10/1992 | (JP) . |
| 5-100645 | 4/1993 | (JP) . |
| 5-145699 | 6/1993 | (JP) . |
| 5-219301 | 8/1993 | (JP) . |
| 6-22250 | 1/1994 | (JP) . |
| 6-186528 | 7/1994 | (JP) . |
| 7-318914 | 12/1995 | (JP) . |
| 9-186312 | 7/1997 | (JP) . |

\* cited by examiner

Primary Examiner—Xiao Wu
(74) Attorney, Agent, or Firm—Parkhurst & Wendel, LLP

(57) ABSTRACT

A TFT(L) 26 with n-channel, which is connected to a transparent pixel electrode 24, and a TFT(D) 27 with p-annel, which is connected to a cathode side of a photodiode 25, are connected to a common source line 22 and a common gate line 23 and are composed so that each of them can be controlled in an ON state independently by impressing a positive voltage $V_L$ or a negative voltage $V_D$ on the gate line 23. A backlight 18 which is provided on a backside of an active matrix panel 13 comprises monochromatic light sources 18a–18c for emitting each monochromatic light of red, blue or green, and a picture of each color is displayed in a time division. While reading a picture, the picture of the components of red, blue and green are read at each simplex pixel by using each of the monochromatic light sources 18a–18c sequentially. A picture at a pixel P1 are read by storing a predetermined electric charge only at the photodiode 25 of the pixel P1 and exposing the photodiode 25 as well as making a liquid crystal layer 14 corresponding to every two pixels P1vertically and horizontally a transmission state, and an original picture is read at all pixels by repeating similar operation at each of pixels which are adjacent to the pixel P1.

50 Claims, 15 Drawing Sheets

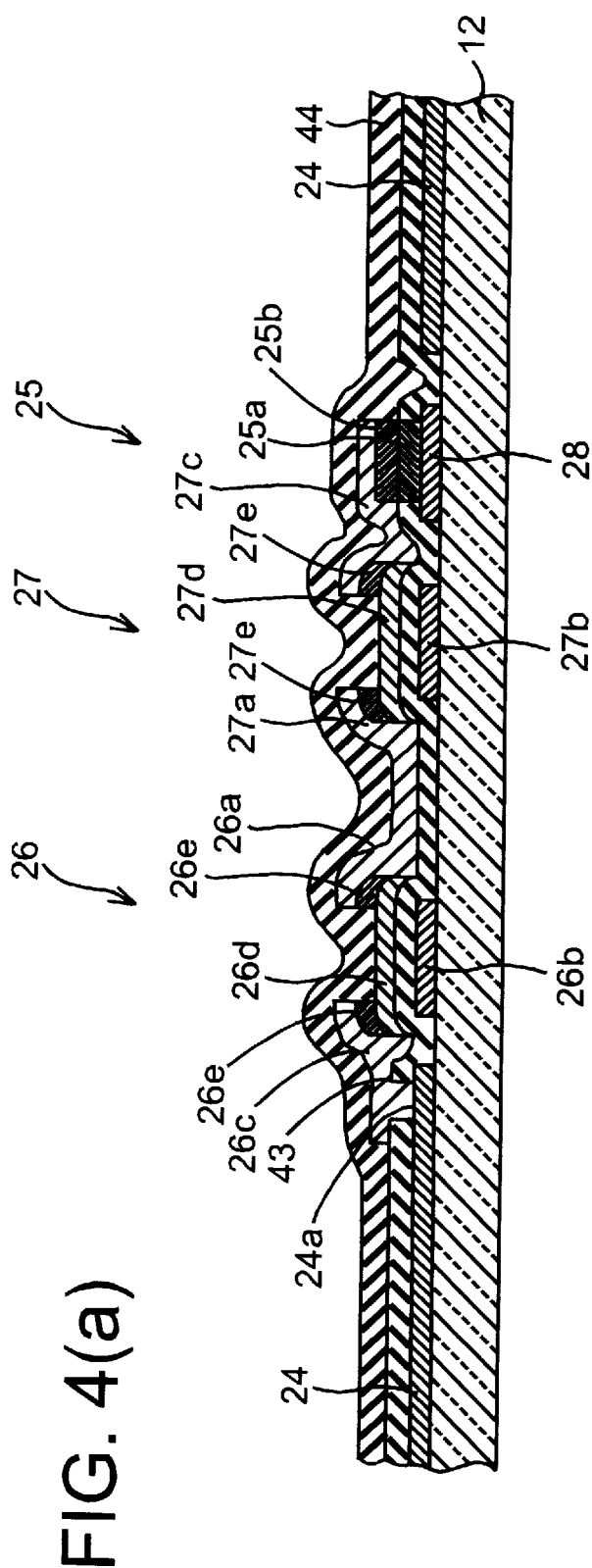
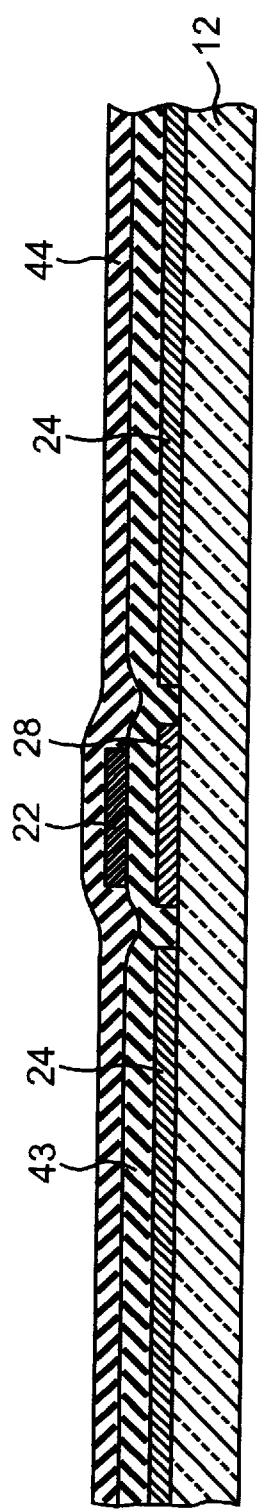
FIG. 4(a)
FIG. 4(b)

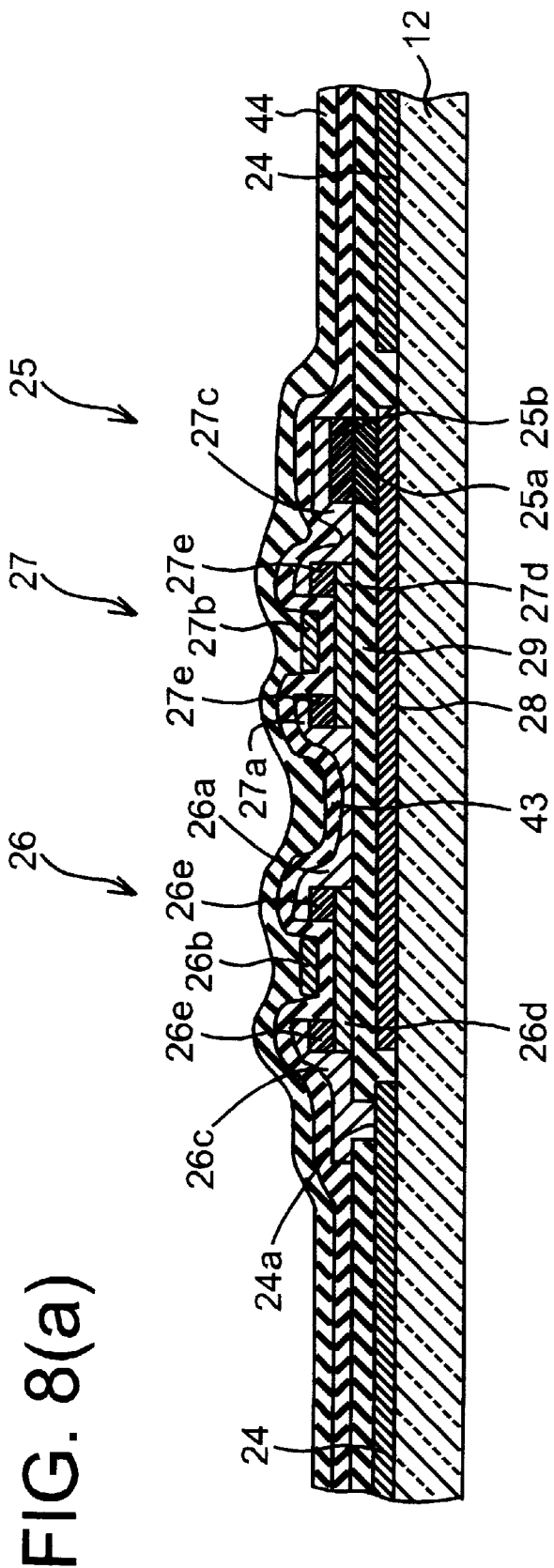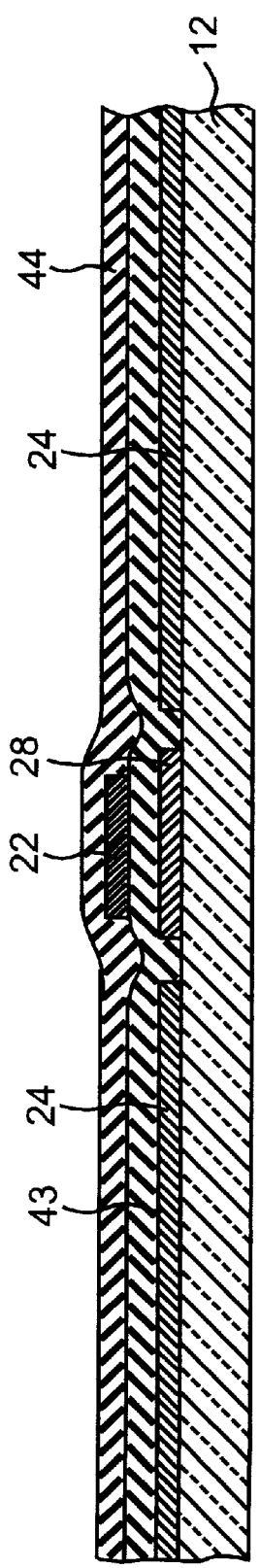
FIG. 8(a)
FIG. 8(b)

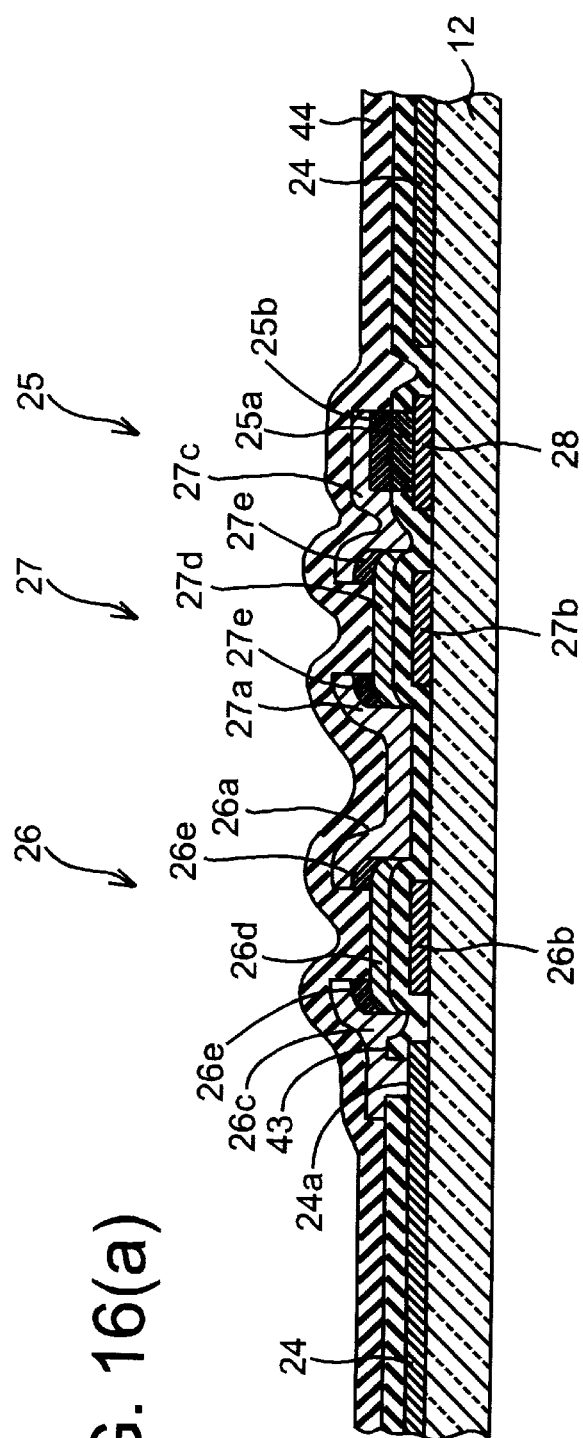
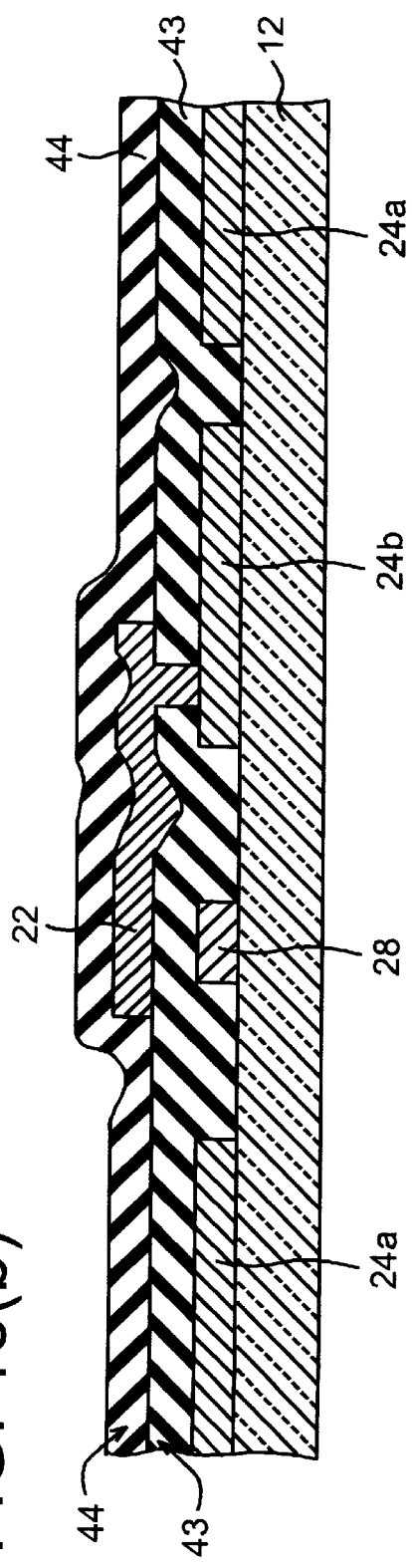
FIG. 16(a)
FIG. 16(b)

LIQUID CRYSTAL DISPLAY WITH IMAGE READING FUNCTION, IMAGE READING METHOD AND MANUFACTURING METHOD

TECHNICAL FIELD

The present invention relates to a liquid crystal display device with a function of reading a picture comprising an active matrix panel, wherein a thin film transistor (TFT) and such photo detector as a photodiode are provided, and a liquid crystal layer, a method of reading a picture by using such liquid crystal display device, and a method of manufacturing such liquid crystal display device.

BACKGROUND ART

In recent years, many display devices with liquid crystal are used in order to downsize a display device of a picture, and particularly, a liquid crystal display device comprising an active matrix panel with TFT has been studied greatly since higher quality of the picture can be obtained easily as compared with a simple matrix type liquid crystal display device.

Meanwhile, in order to downsize a read device of an original picture, the device is known wherein the picture can be read by putting the original closely on an image sensor which is arrayed two-dimensionally without using the scan system of the original or the sensor section.

A device is proposed for downsizing the whole device and improving the operationalization by reading the original picture and obtaining picture data as well as displaying the picture with the combination of the above-mentioned display device and read device of the picture.

This kind of device, as disclosed, for example, in Japanese Unexamined Patent Publications No. 4-282609, is composed in the arrangement of a transparent substrate with an image sensor on the backside of a transparent substrate with TFT and a transparent pixel electrode in a liquid crystal display device. In the liquid crystal display device, while reading an original picture, the original picture is read by making all the pixels in liquid crystal a transmission state, irradiating backlight over the whole original, and detecting the strength of reflected light from the original.

A device for displaying and reading a color picture comprises a back light source of white light and a micro color filter with the field for transmitting the light of red, green or blue at each pixel, and displays the color picture by controlling the light transmittance of each color, while the device reads the color picture by detecting the quantity of reflected light of each color from the original. That is, the display and read of a pixel (hereinafter referred to as 'color pixel') of a predetermined color are executed by joining three pixels (each pixel is hereinafter referred to as 'simplex pixel') of red, green and blue.

However, in the composition of arranging a transparent substrate with TFT and a transparent substrate with an image sensor in layers as described above, the visibility and the read property of the picture are deteriorated since the transmittance of backlight and reflected light from the original is decreased As disclosed, for example, in Japanese Unexamined Patent Publications No. 5-145699, a read device of a picture with complete control of open and shut is proposed for a means of preventing the deterioration of such visibility. However, in this case, the problem is that the complication of structure and the deterioration of reliability are caused by providing the mechanism of open and shut, and additionally, the deterioration of operationalization is caused by needing the operation of open and shut in each execution of reading the picture.

It is written in the above-mentioned Japanese Unexamined Patent Publications No. 4-282609 that TFT and an image sensor may be provided actually on the same transparent substrate although the concrete constitution is not described However, generally in the case of constituting in this way, since it is necessary to form not only the wiling pattern for controlling TFT for display but also the wiring pattern for controlling an image sensor on the same substrate, the deterioration of visibility is caused by the decrease of effective display area of a picture.

Generally, although higher pixel density is often necessary for a read picture than a display picture, in the case of the device for reading a color picture with a micro color filter, the problem is that the color picture can not be read with high pixel density since the picture data of a color pixel are obtained by joining three simplex pixels of red, green and blue as described above. Since only the light of the color which is transmitted through a micro color filter is used for the display and for the illumination of an original, it is necessary to increase the quantity of emitted light from a back light source in order to increase the quantity of the transmitted light. Accordingly, the problem is the increase of manufacturing cost by comprising a micro color filter, and additionally, high electric power consumption.

In the case of reading an original picture by irradiating backlight over the whole original as described above in reading the original picture, the problem is that the crosstalk between adjacent pixels gets high and the reslution tends to decline since reflected light from adjacent pixels in the original enters an image sensor. The higher the pixel density in reading is, the greater this problem is.

In regard to this problem, for example, in Japanese Unexamined Patent Publications No. 5-219301, the composition is disclosed wherein an original picture is read so that the adjacent luminescent elements will not emit light simultaneously in the display and read device in which a substrate with such self-luminescent element as EL element, LED and PDP and a substrate with a photo detector are laminated. Even in this case, it is impossible to avoid the deterioration of the visibility and the read property of a picture because of laminating two substrates. Moreover, the problem is that the increase of manufacturing cost and the decrease of yield are caused since it is difficult to form the above-mentioned luminescent element on a substrate.

In order to solve the above-mentioned problems, it is considered that an original picture is read by making liquid crystal a transmission state at each set of pixels which are not adjacent to each other and exposing a photo detector as well as providing a pixel electrode and a photo detector on the same substrate and making common a gate line and a source line at TFT for a pixel electrode and for a photo detector. However, when such charge-storage type as a photodiode is used as the photo detector, there is the possibility of causing the reduction of reading rate by the composition of storing electric charge at the photo detectors of all pixels in each exposing process at each set of pixels.

The present invention, in view of the above-mentioned respects, aims to provide a liquid crystal display device with a function of reading a picture wherein the downsizing of the device, the improvement of operationalization and the decrease of manufacturing cost can be intended without causing the deterioration of visibility, a method of reading a picture by using such liquid crystal display device, and a method of manufacturing such liquid crystal display device.

Moreover, the present invention aims to provide a liquid crystal display device with a function of reading a picture wherein high pixel density in reading can be obtained and the decrease of manufacturing cost and electric power consumption can be intended, and a method of reading a picture by using such liquid crystal display device.

Furthermore, the present invention aims to provide a liquid crystal display device with a function of reading a picture wherein the crosstalk between adjacent pixels can be reduced, the resolution of reading a picture can be improved and high reading rate can be intended, and a method of reading a picture by using such liquid crystal display device.

DISCLOSURE OF THE INVENTION

The present invention has been intended to solve the above-mentioned purposes. To attain the purposes, the present invention is constituted as follows.

That is, in a liquid crystal display device with a function of reading a picture in the present invention, a second transistor for a photo detector is connected to a source line and a gate line to which a first transistor for a pixel electrode is connected, and a threshold value of a gate voltage in the first transistor and a threshold value of a gate voltage in the second transistor are determined so that at least only the second transistor can be made an ON state.

Since such composition can make only the second transistor the ON state and makes it possible to read an original picture, which is detected by the photo detector, with the source line and the gate line common to the first transistor which is connected to each pixel electrode without providing the source line and the gate line exclusive to the second transistor which is connected to one end of the photo detector, the downsizing of the device and the improvement of operationalization and the decrease of manufacturing cost can be intended without causing the deterioration of visibility by the decrease of effective display area of the picture.

In order to enable only the second transistor to be the ON state as described above, it is preferred to use transistors with a reversed polarity to each other, such as a transistor with n-channel for the first transistor, and meanwhile, a transistor with p-channel for the second trator. Consequently, the first transistor and the second transistor can be made the ON state independently by switching the polarity of the voltage impressed on the gate line. Further, in the case of constituting in this way, high permissibility to the dispersion in manufacturing of the threshold value of the gate voltage and the voltage impressed on the gate line at the first transistor and the second transistor facilitates the decrease of manufacturing cost.

A first trator and a second transistor may be composed so as to be made an ON state simultaneously as well by using a charge-storage type photo detector as the above-mentioned photo detector and using a liquid crystal which is made a transmission state under an action of an electric field as the above-mentioned liquid crystal. In this case, since the holding of electric charge prior to the exposure can be executed at the photo detector by making the first transistor and the second transistor the ON state simultaneously and making the liquid crystal the transmission state, the decrease of manufacturing cost can be intended by simplifying the control for reading an original picture.

In order to enable a first transistor and a second transistor to be an ON state simultaneously as well, it is preferred to use, as an example of these transistors, transistors with the same polarity of n-channel or p-channel as each other wherein a threshold absolute value of a gate voltage in the second transistor is lower than that of a gate voltage in the first transistor.

That is, for example, when the threshold value of the first transistor is $V_L$ and the threshold value of the second transistor is $V_D$ and both of them are the transistors with n-channel, only the second transistor can be made the ON state if the voltage Vg which is impressed on a gate line satisfies $V_D < Vg < V_L$, while both of the transistors can be made the ON state if Vg satisfies $V_L < Vg$.

Meanwhile, in order to make a liquid crystal a transmission state under an action of an electric field, it is preferred to use, for example, a twisted nematic (TN) liquid crystal with a negative dielectric constant anisotropy of a right angle and a pair of polarizers which are provided on both sides of the liquid crystal so that a polarized direction of one of the polarizers and an oriented direction of the liquid crystal can be parallel to each other and polarized directions of both polarizers can be orthogonal to each other, or to use a TN liquid crystal with a positive dielectric constant anisotropy of a right angle so that an oriented direction of the liquid crystal and polarized directions of both polarizers can be parallel to each other.

In order to prevent an influence on a display picture by an electric current which flows through a photo detector when a second transistor besides a first transistor are made an ON state in displaying a picture, for example, when a photodiode is used as the photo detector, it is preferred to connect the above-mentioned photodiode so that a reverse bias voltage can be impressed in displaying the picture. In displaying a picture, if a voltage which is equal to a source line is impressed on the other end line which is connected to the other end of a photo detector, an influence on a display picture can be prevented theoretically with certainty.

Moreover, a conductive light shielding film which is formed on the same substrate as a photo detector may be used as the other end line which is connected to the other end of the photo detector, and in the case of applying an in-plane switching system wherein a pixel electrode and an opposite electrode are formed on the same substrate, the opposite electrode may be used. Consequently, since it is not necessary to provide a wiring pattern anew, the deterioration of visibility because of the decrease of effective display area of a picture can be prevented, and additionally, the decrease of manufacturing cost can be intended.

By means of providing a touch sensor for detecting a setting state of an original on a surface side of a liquid crystal, the putting of the original can be confirmed, and the read of a picture can be started automatically when the putting of the original is detected, and picture data according to the size can be obtained by detecting the size of the original which is put on.

A method of reading a picture in the present invention, with the use of the above-mentioned liquid crystal display device with a function of reading a picture, comprises the steps of detecting a light exposure of a photo detector by making only a second transistor an ON state after making a liquid crystal a transmission state and exposing the photo detector, at which a predetermined electric charge is held, to a reflected light from an original.

Consequently, in reading an original picture, since only the photo detector is connected to a source line, the original picture can be read without being affected by electric charge which is held at a pixel electrode.

In the case of using a liquid crystal display device with a function of reading a picture wherein a first transistor and a second transistor can be made an ON state simultaneously, the shortening of picture reading time can also be intended by holding a predetermined electric charge at a photo detector simultaneously while making a liquid crystal a transmission state.

A method of manufacturing a liquid crystal display device with a finction of reading a picture in the present invention comprises the step of forming the other end line which is connected to the other end of a photo detector in a process of forming a gate electrode of at least one of a first transistor and a second transistor while manufacturing the above-mentioned liquid crystal display device with a function of reading a picture.

Consequently, since a liquid crystal display device with a function of reading a picture can be manufactured in the same process as ordinary liquid crystal display devices, the decrease of manufacturing cost can be intended easily.

The display and read of a color picture can also be executed by further comprising a color filter in which a field for transmitting a light of each predetermined color is formed corresponding to each pixel electrode.

Meanwhile, since it is possible to irradiate a light of a plurality of colors to an original at each pixel and detect a quantity of a reflected light by comprising a plurality of back light sources for emitting a light of a different color from each other, a color picture can be read with high pixel density.

A liquid crystal display device with a function of reading a picture in the present invention comprising a pixel electrode, an opposite electrode which is provided opposite to the pixel electrode, a liquid crystal which is provided between the pixel electrode and the opposite electrode, and a photo detector for detecting a quantity of a reflected light from an original which is provided corresponding to each of the pixel electrodes further comprises a plurality of back light sources for emitting a light of a different color from each other, and is composed so that in displaying the picture a color picture can be displayed by lighting each of the above-mentioned back light sources selectively in sequence and displaying the picture of each color in a time division, and in reading the picture the color picture can be read by lighting each of the above-mentioned back light sources selectively in sequence and irradiating the light of each color to the original and detecting the quantity of the reflected light of each color from the original.

Consequently, since it is possible to irradiate the light of a plurality of colors to the original at each pixel and detect the quantity of the reflected light, the color picture can be read with high pixel density. Furthermore, since it is not necessary to provide a color filter, the manufacturing cost can be decreased, and since the light of the back light sources is never attenuated by the color filter, the quantity of emitted light from the back light sources can be decreased and the electric power consumption can be decreased.

A liquid crystal display device with a function of reading a picture comprising a pixel electrode, an opposite electrode which is provided opposite to the pixel electrode, a liquid crystal which is provided between the pixel electrode and the opposite electrode, and a photo detector for detecting a quantity of a reflected light from an original which is provided corresponding to each of the pixel electrodes further comprises a color filter in which a display field for transmitting a light of each predetermined color and a illumination field for transmitting a light of all colors are formed corresponding to each pixel, and a plurality of back light sources for emitting a light of a different color from each other and a light of a white color when they are lit simultaneously, and is composed so that in displaying the picture a color picture can be displayed with an additive process of the light which is transmitted through the display field of each color in the above-mentioned color filter by lighting all of the above-mentioned back light sources as well as making the liquid crystal corresponding to the illumination field in the above-mentioned color filter a shielding state and meanwhile making the liquid crystal corresponding to the display field a transmission state according to a picture signal, and in reading an original picture the color picture can be read by lighting each of the above-mentioned back light sources selectively in sequence and irradiating the light of each color to the original through the illumination field in the above-mentioned color filter and detecting the quantity of the reflected light of each color from the original as well as making the liquid crystal corresponding to the display field in the above-mentioned color filter a shielding state and meanwhile making the liquid crystal corresponding to the illumination field a transmission state.

Consequently, since it is possible to irradiate the light of a plurality of colors to the original at each pixel through a pixel electrode for illumination and the illumination field in the color filter and detect the quantity of the reflected light, the color picture can be read with high pixel density. Moreover, in displaying a picture, since each pixel is made a continuous emitting state as the pixel of color according to the display field in the color filter, a frame period can be determined at a desirable length without causing flicker.

A liquid crystal display device with a function of reading a picture comprising a pixel electrode, an opposite electrode which is provided opposite to the pixel electrode, a liquid crystal which is provided between the pixel electrode and the opposite electrode, and a photo detector for detecting a quantity of a reflected light from an original which is provided corresponding to each of the pixel electrodes further comprises a pixel electrode for illumination which is provided corresponding to the above-mentioned pixel electrode, an opposite electrode for illumination which is provided opposite to the above-mentioned pixel electrode for illumination, a color filter in which a display field for transmitting a light of each predetermined color is formed corresponding to the above-mentioned pixel electrode and a illumination field for transmitting a light of all colors is formed corresponding to the above-mentioned pixel electrode for illumination, and a plurality of back light sources for emitting a light of a different color from each other and a light of a white color when they are lit simultaneously, and is composed so that in displaying the picture a color picture can be displayed with an additive process of the light which is transmitted through each of the above-mentioned pixel electrodes and the display field of each color in the above-mentioned color filter by lighting all of the above-mentioned back light sources as well as determining a voltage between the above-mentioned pixel electrode for illumination and the above-mentioned opposite electrode for illumination at a predetermined voltage and making a light which enters the above-mentioned pixel electrode for illumination a shielding state, and in reading an original picture the color picture can be read by lighting each of the above-mentioned back light sources selectively in sequence and irradiating the light of each color to the original through the above-mentioned pixel electrode for illumination and the illumination field in the above-mentioned color filter and detecting the quantity of the reflected light of each color from the original as well as determining a voltage between the above-mentioned pixel electrode and the above-mentioned opposite electrode at a predetermined voltage and making a light which enters the above-mentioned pixel electrode the shielding state and meanwhile determining a voltage between the above-mentioned pixel electrode for illumination and the above-mentioned opposite electrode for illumination at a predetermined voltage and making a light which enters the above-mentioned pixel electrodes for illumination a transmission state.

Consequently, since it is easily possible to irradiate the light of a plurality of colors to the original at each pixel through the pixel electrode for illumnation and the illumination field in the color filter and detect the quantity of the reflected light, like the above-mentioned case, the color picture can be read with high pixel density.

In addition to the above-mentioned composition, a liquid crystal display device with a function of reading a picture further comprises a plurality of source lines for transferring a picture signal, a plurality of gate lines for transferring a scanning signal which are provided in a crossing direction with the above-mentioned source lines, a transistor for connecting or disconnecting the above-mentioned source lines and the above-mentioned pixel electrode according to the scanning signal transferred from the above-mentioned gate lines, which is connected to the above-mentioned source lines and the above-mentioned gate lines as well as the above-mentioned pixel electrode at each of the pixel electrodes, and a switching method of connecting or disconnecting the above-mentioned opposite electrode and the above-mentioned opposite electrode for illumination, and may be composed so that the above-mentioned pixel electrode for illumination can be connected to the above-mentioned source lines, and the above-mentioned liquid crystal can be made a transmission state under an impression of a predetermined voltage.

Consequently, in displaying the picture, if a connection of the opposite electrode to the opposite electrode for illumination is cut with the switching method after storing or discharging a predetermined electric charge beforehand between the pixel electrode for illumination and the opposite electrode for illumination, it is easily possible to determine the voltage between the pixel electrode for illumination and the opposite electrode for illumination at the predetermined voltage and make the light which enters the above-mentioned pixel electrode for illumination the shielding state irrespective of a voltage of the source lines for a picture display, and in reading an original picture, if the transistor is made an OFF state and a predetermined voltage is impressed on the source lines after making the transistor an ON state beforehand and storing or discharging a predetermined electric charge between the pixel electrode and the opposite electrode, it is easily possible to determine the voltage between the pixel electrode and the opposite electrode at the predetermined voltage and make the light which enters the pixel electrode the shielding state and meanwhile determine the voltage between the pixel electrode for illumination and the opposite electrode for illumination at the predetermined voltage and make the light which enters the pixel electrode for illumination the transmission state.

A liquid crystal display device with a function of reading a picture in the present invention comprising a plurality of source lines for transferring a picture signal, a plurality of gate lines for transferring a scanning signal which are provided in a crossing direction with the above-mentioned source lines, a pixel electrode which is provided corresponding to each crossing section of the source lines and the gate lines, a first transistor which is connected to the source lines and the gate lines as well as each of the pixel electrodes, an opposite electrode which is provided opposite to the pixel electrode, a liquid crystal which is provided between the pixel electrode and the opposite electrode, and a photo detector for detecting a quantity of a reflected light from an original which is provided corresponding to each of the pixel electrodes further comprises a second transistor which is connected to the above-mentioned source lines and the above-mentioned gate lines as well as one end of the photo detector, the other end line which is connected to the other end of the photo detector, and a back light source for emitting a light for displaying and for illuminating the original, and is composed so that in reading the picture an original picture can be read by making the above-mentioned liquid crystal a transmission state at each single pixel or each set of pixels which are not adjacent to each other and irradiating the light of the above-mentioned back light source to the original and detecting the quantity of the reflected light from the original with the above-mentioned photo detector.

Since such composition makes it possible to display and read the picture without providing the source lines and the gate lines exclusive to the second transistor which is connected to one end of the photo detector, the downsizing of the device and the improvement of operationalization and the decrease of manufacturing cost can be intended without causing the deterioration of visibility by the decrease of effective display area of the picture, and since only the pixels to be read which are not adjacent to each other are illuminated and the light from adjacent pixels never enters, the crosstalk can be reduced and the resolution of reading the picture can be improved.

It is preferred that the above-mentioned set of pixels which are not adjacent to each other is determined at, according to the pixel density in reading, for example, a set of every two or more pixels, or a set of pixels which are adjacent to each other in a predetermined direction and are every two or more pixels in a direction vertical to the above-mentioned predetermined direction.

The display and read of a color picture can also be executed by comprising a color filter in which a field for transmitting a light of each predetermined color is formed corresponding to each pixel electrode.

Since it is possible to irradiate a light of a plurality of colors to an original at each pixel and detect a quantity of a reflected light by further comprising a plurality of back light sources for emitting a light of a different color from each other, a color picture can be read with high pixel density and resolution. A liquid crystal display device with a function of reading a picture in the present invention uses a photo detector, which detects a quantity of a reflected light from an original by a discharge of an electric charge held beforehand due to the reflected light from the original, as the above-mentioned photo detector, and is composed so that in reading the picture an original picture can be read by making the above-mentioned liquid crystal a transmission state and irradiating the light of the above-mentioned back light sources to the original and detecting the quantity of the reflected light from the original with the abovementioned photo detector as well as holding an electric charge at the above-mentioned photo detector at each single pixel or each set of pixels which are not adjacent to each other. Since such composition, likewise, makes it possible to display and read the picture without providing the source lines and the gate lines exclusive to the second transistor which is connected to one end of the photo detector, the downing of the device and the improvement of operationalization and the decrease of manufacturing cost can be intended without causing the deterioration of visibility by the decrease of effective display area of the picture, and since the storage of electric charge at the photo detector and the illumination on the original are executed at only the pixels to be read which are not adjacent to each other and the light from adjacent pixels never enters, the crosstalk can be reduced and the resolution of reading the picture can be improved, and additionally, high reading rate is intended.

It is preferred that the above-mentioned set of pixels which are not adjacent to each other is determined at, according to the pixel density in reading, for example, a set of every two or more pixels, or a set of pixels which are adjacent to each other in a predetermined direction and are every two or more pixels in a direction vertical to the above-mentioned predetermined direction.

The display and read of a color picture can also be executed by further comprising a color filter in which a field for transmitting a light of each predetermined color is formed corresponding to each pixel electrode.

Meanwhile, since it is possible to irradiate a light of a plurality of colors to an original at each pixel and detect a quantity of a reflected light by comprising a plurality of back light sources for emitting a light of a different color from each other, a color picture can be read with high pixel density and resolution.

BRIEF DESCRIPTION OF THE DRAWINGS

FIG. 4 is a cross section on lines A—A and B—B of FIG. 3.

FIGS. 8(a)–(b) is a cross section on lines A—A and B—B of FIG. 6.

FIGS. 16(a)–(b) is a cross section on lines A—A and B—B of FIG. 14.

DETAILED DESCRIPTION OF THE PREFERRED EMBODIMENTS

The details of the present invention are described concretely on the basis of Embodiments.

(Embodiment 1)

Figure 1:
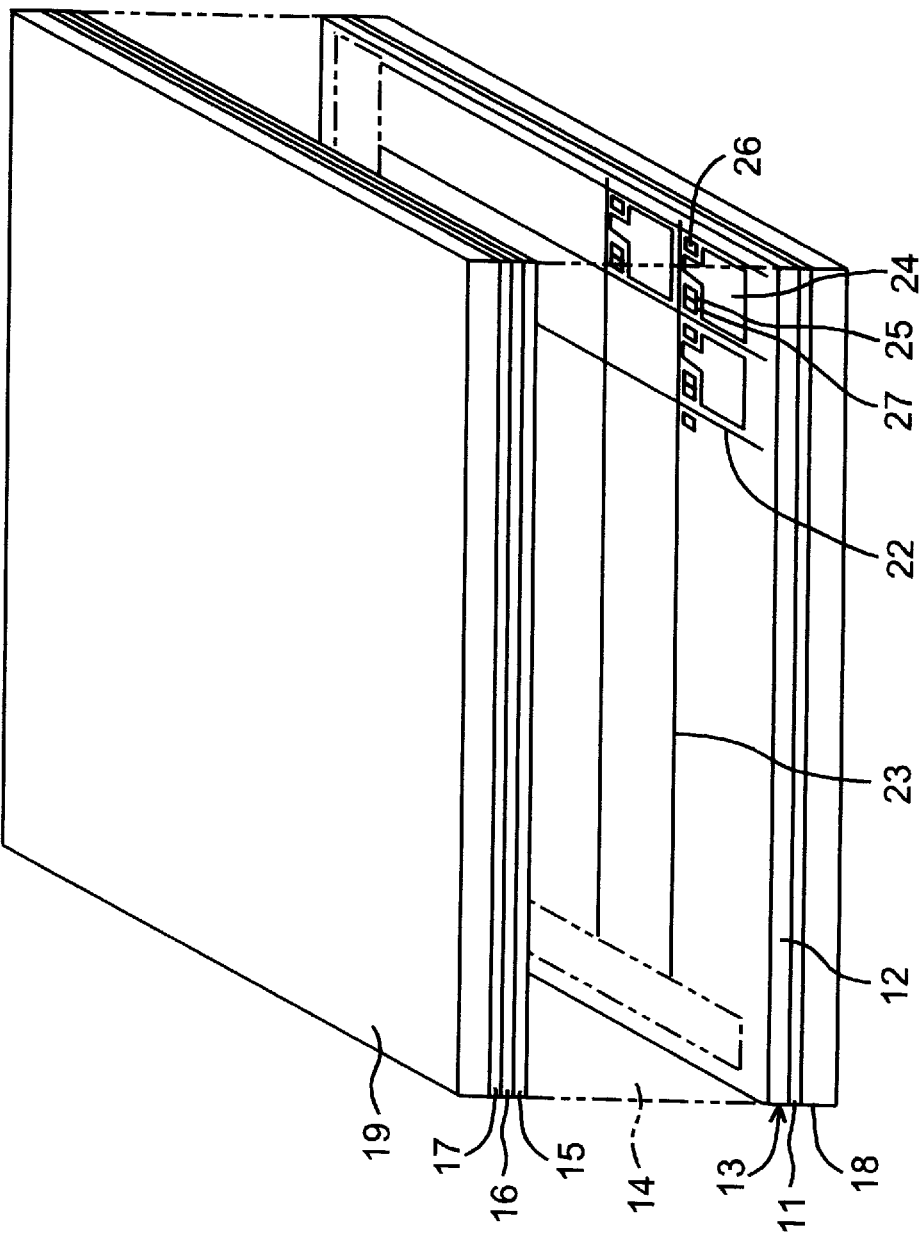
FIG. 1 is a perspective view showing an external constitution of a liquid crystal display device with a function of reading a picture in Embodiment 1.

An example of a liquid crystal display device wherein a surface of displaying a picture is placed so as to be approximately level, as shown in FIG. 1, is described as a liquid crystal display device with a function of reading a picture in Embodiment 1 of the present invention.

(1) A General Composition of the Liquid Crystal Display Device

This liquid crystal display device is composed in a lamination of a polarizing filter layer 11, an active matrix panel 13 which is detailed below with a transparent pixel electrode 24 on a glass substrate 12, a liquid crystal layer 14, an opposite glass substrate 16 with a transparent opposite electrode 15 and a polarizing filter layer 17. A backlight 18 is provided below the polarizing filter layer 11, while a touch panel unit 19 is provided above the polarizing filter layer 17.

When this liquid crystal display device is applied to the device, such as personal computers, wherein a surface of displaying a picture is inclined, an original guide wherein the form of its cross section is L-shaped, quadrilateral with a lack of one side and linear may be provided in the peripheral part of picture display field, and while reading the picture, the displaying surface may be revolved so as to be approximately level as shown in FIG. 1.

The above-mentioned liquid crystal layer 14 is formed by sealing a twisted nematic liquid crystal of a right angle into a predetermined gap between the active matrix panel 13 and the transparent opposite electrode 15. By means of using a liquid crystal with a negative dielectric constant anisotropy as this liquid crystal as well as arranging the polarizing filter layer 11 and the polarizing filter layer 17 in such direction (crossed nicols) that a polarized direction of one of the polarizing filter layers and an oriented direction of the liquid crystal are parallel to each other and polarized directions of both polarizing filter layers 11 and 17 are orthogonal to each other, the liquid crystal layer 14 (for further details, the polarizing filter layers 11–17 and the liquid crystal layer 14) is composed so as to be made a transmission state under the action of electric field.

The transparent opposite electrode 15 is determined at a predetermined electric potential Vp, and in order to reduce the driving voltage, the electric potential Vp may be reversed at each horizontal scanning period or each field period.

Various types such as a contact type and a capacitance type are applicable to the touch panel unit 19. Although this touch panel unit 19 do not necessarily has to be provided, by means of providing this touch panel unit, the putting of an original can be confirmed, and additionally, the read of a picture can be started automatically when the putting of the original is detected, and picture data according to the size can be obtained by detecting the size of the original which is put on.

(2) A Composition of a Circuit Which is Formed on the Active Matrix Panel 13

Figure 2:
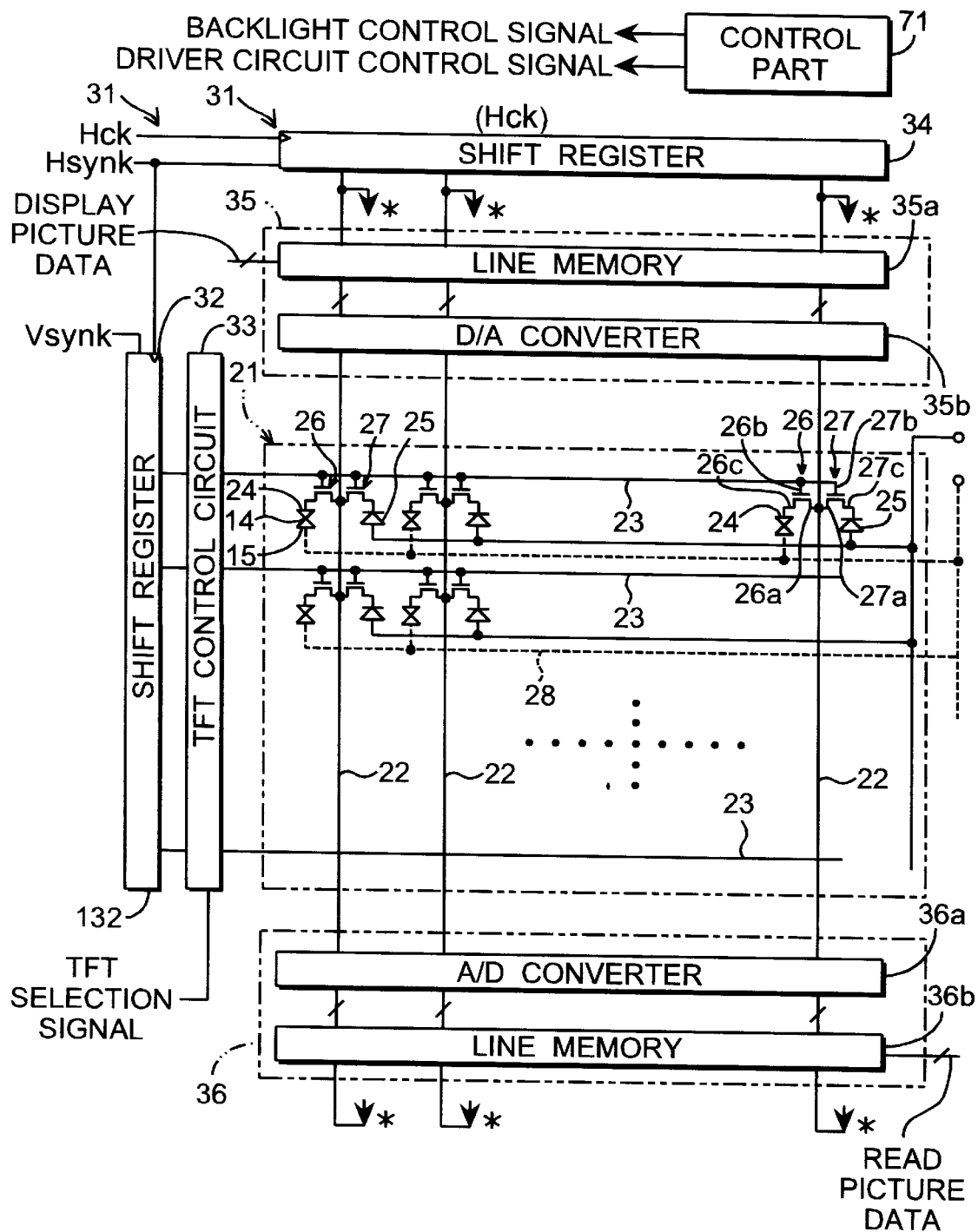
FIG. 2 is a description view showing a circuit constitution of an active matrix panel 13 in Embodiment 1.

As shown in FIG. 2, a display and read part 21, a driver circuit part 31 which is arranged at its periphery, and a control part 71 for controlling the operation of the driver circuit part 31 and the backlight 18 are provided on the active matrix panel 13. The control part 71 may be provided outside the active matrix panel 13.

A source line 22 and a gate line 23 in the directions which are orthogonal to each other are provided in the display and read part 21. The transparent pixel electrode 24, a photodiode 25, a TFT(L) 26 for the transparent pixel electrode 24, and a TFT(D) 27 for the photodiode 25 are provided corresponding to each crossing section of the source line 22 and the gate line 23.

The TFT(L) 26 is formed into a TFT with n-channel, while the TFT(D) 27 is formed into a TFT with p-channel. That is, each of them can be controlled in an ON state independently by impressing a positive voltage VL or a negative voltage VD on the gate line 23. Although each polarity of the TFT(L) 26 and the TFT(D) 27 may be reverse, generally, to form the TFT(L) 26, which is connected to the transparent pixel electrode 24, into a TFT with n-channel facilitates high displaying rate.

Source electrodes 26a and 27a of the above-mentioned TFT(L) 26 and TFT(D) 27 are connected to the source line 22, and gate electrodes 26b and 27b are connected to the gate line 23.

A drain electrode 26c of the TFT(L) 26 is connected to the transparent pixel electrode 24, while a drain electrode 27c of the TFT(D) 27 is connected to a cathode side of the photodiode 25. An anode side of the photodiode 25 is grounded through a light shielding electrode 28. That is, the photodiode 25 is connected so that a reverse bias voltage can be impressed.

In order to intend the improvement of the quality of a display picture, capacitors may be provided in parallel with the transparent pixel electrode 24 and the transparent opposite electrode 15, and capacity may be held between each transparent pixel electrode 24 and the gate line 23 of adjacent pixels.

A shift register 32, a TFT control circuit 33, a shift register 34, a charging voltage output circuit 35 and a read circuit 36 are provided in the driver circuit part 31. The shift register 32 synchronizes a pulse of a vertical synchronizing signal V synk, which is input once at each vertical scanning period, with a horizontal synchronizng signal H synk which is a vertical clock, and shifts sequentially and outputs the pulse as a timing signal to the TFT control circuit 33.

The TFT control circuit 33, according to the above-mentioned timing signal and a TFT selection signal for directing a selection of the TFT(L) 26 or the TFT(D) 27, outputs a drive pulse of a gate voltage Vg with the voltage of VL (positive) or VD (negative) to each gate line 23 sequentially, and makes the TFT(L) 26 and the TFT(D) 27 on each horizontal scanning line an ON state.

The shift register 34 synchronizes a pulse of a horizontal synchronizing signal H synk, which is input once at each horizontal scanning period, with a horizontal clock H ck, and shifts sequentially and outputs a timing signal for taking in display picture data of each pixel and outputting read picture data to the charging voltage output circuit 35 and the read circuit 36.

The charging voltage output circuit 35 is composed of a line memory 35a and a D/A converter (a digital-analog converter) 35b.

The above-mentioned line memory 35a is composed so as to hold display picture data of each pixel for one horizontal scanning line, according to the timing signal from the shift register 34.

The D/A converter 35b is composed so as to output a source voltage Vs (for example, 0–6 V) according to the display picture data, which is held in the line memory 35a, to the source line 22, and store a predetermined electric charge between the transparent pixel electrode 24 and the transparent opposite electrode 15 or at the photodiode 25.

Meanwhile, the read circuit 36 is composed of an A/D converter (an analog-digital converter) 36a and a line memory 36b.

The A/D converter 36a is connected to the source line 22 and detects light exposure of the photodiode 25 to reflected light from an original, and outputs read picture data of each pixel. For furter details, after electric charge, which is stored at the photodiode 25 by a predetermined voltage (for example, 5–6 V) output from the D/A converter 35b beforehand, is discharged by the exposure to reflected light from the original, the converter detects the quantity of electric charge which is necessary for the replenishment while replenishing the discharged electric charge, and outputs digital data correspondingly. The voltage at both ends of the photodiode 25 after discharging as described above may be detected, as well as thus the quantity of electric charge which is necessary for the replenishment of electric charge is detected.

The line memory 36b holds the read picture data of each pixel for one horizontal scanning line, which is output from the A/D converter 36a, for the time being, and outputs sequentially, according to the timing signal from the shift register 34.

(3) A Concrete Composition and a Manufacturing Method of the Active Matrix Panel 13

Figure 3:
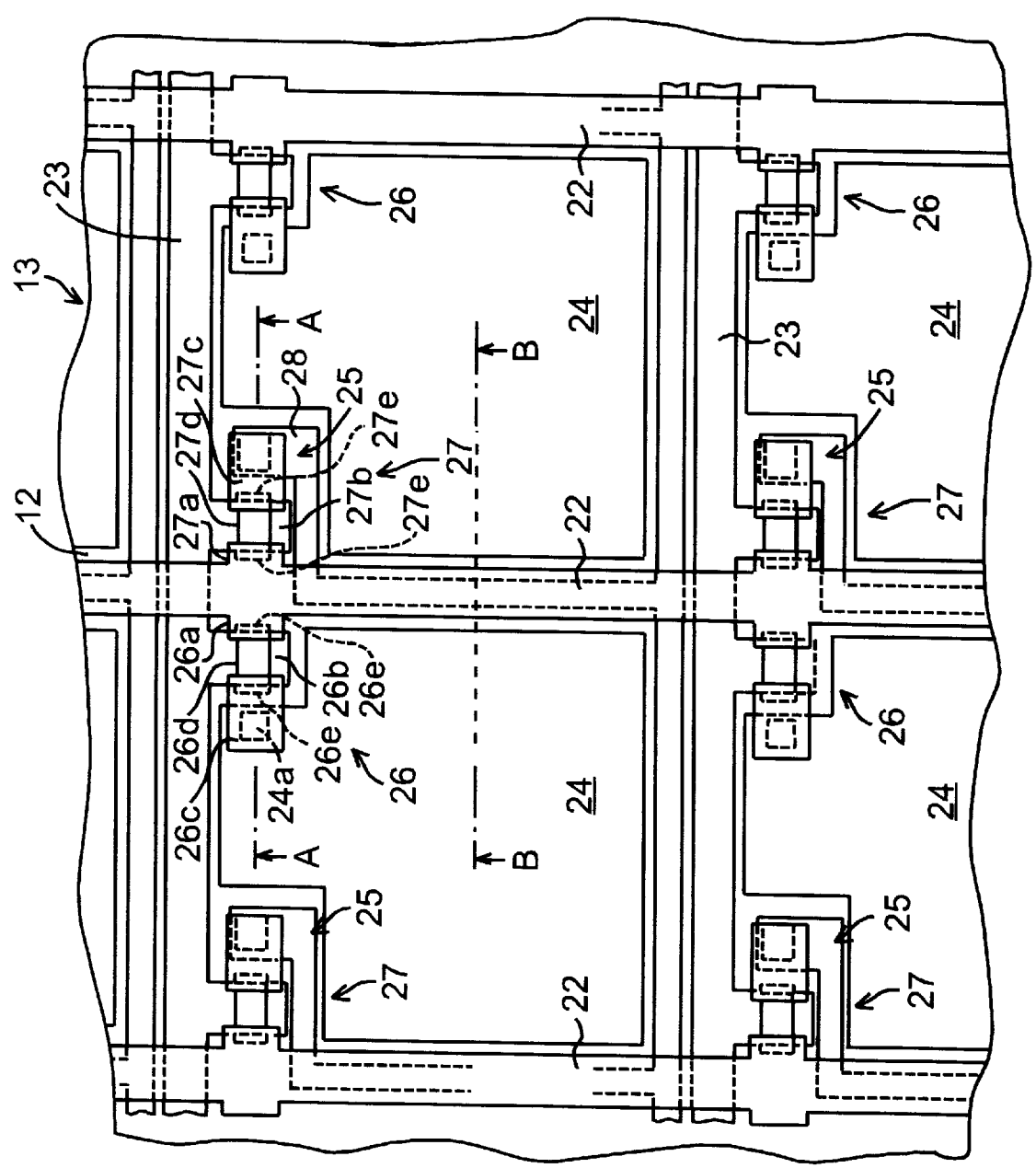
FIG. 3 is a plan view showing a concrete constitution of an active matrix panel 13 in Embodiment 1.
Figure 5A:
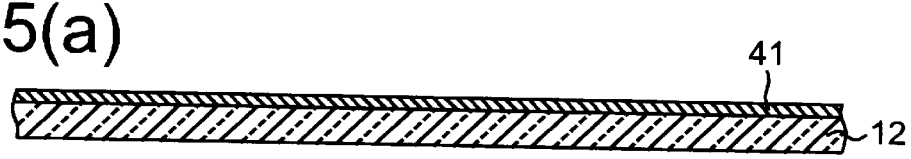
FIGS. 5(a)–(h) is a description view showing a method of manufacturing an active matrix panel 13 in Embodiment 1.
Figure 5B:
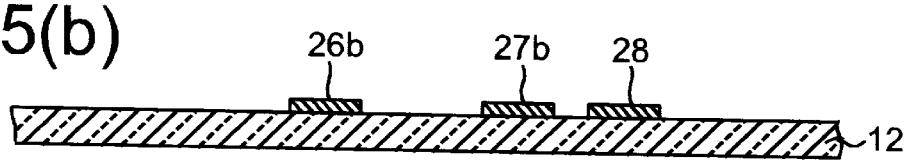
Figure 5C:
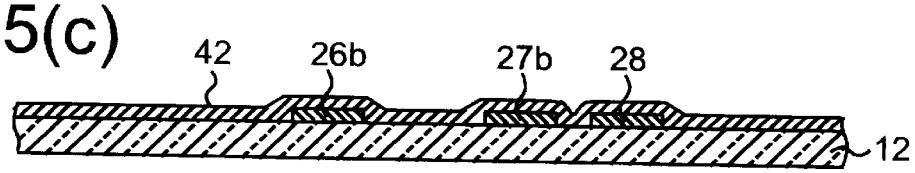
Figure 5D:
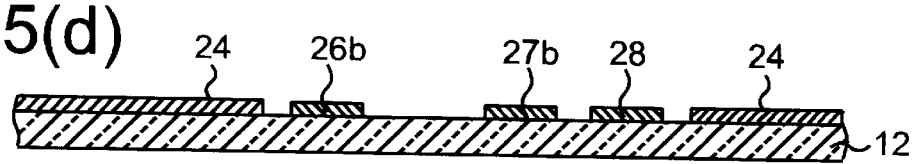
Figure 5E:
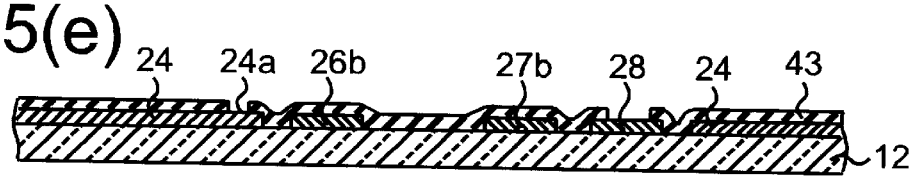
Figure 5F:
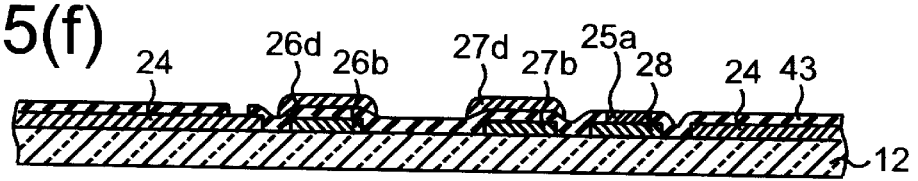
Figure 5G:
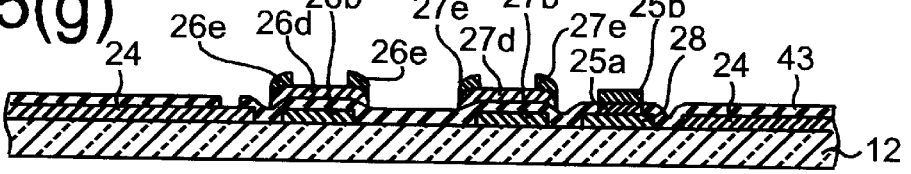
Figure 5H:
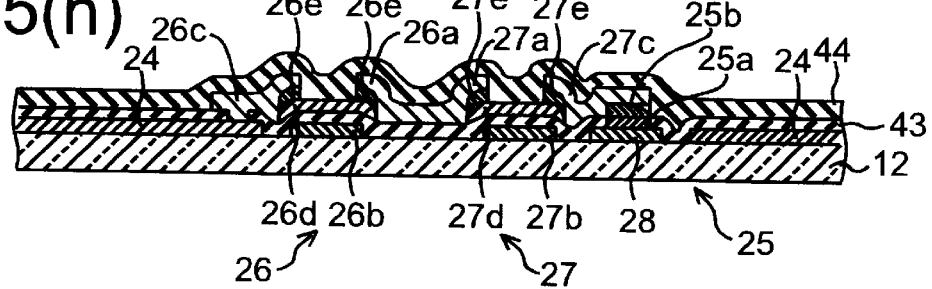

The active matrix panel 13, such as shown in FIG. 3 and FIG. 4, is composed in the arrangement of the transparent pixel electrode 24, the photodiode 25, the TFT(L) 26 and the TFT(D) 27 on the glass substrate 12.

The above-mentioned photodiode 25 is composed of semiconductor layers 25a and 25b.

The TFT(L) 26 and the TFT(D) 27 are composed of the source electrodes 26a and 27a, the gate electrodes 26b and 27b, the drain electrodes 26c and 27c, semiconductor layers 26d and 27d, ohmic layers 26e and 27e, and a gate insulation film 43. In FIG. 3, the gate insulation film 43 is omitted for convenience. The above-mentioned source electrodes 26a and 27a, and the above-mentioned gate electrodes 26b and 27b are composed of convex parts which are formed on the source line 22 and the gate line 23 respectively.

The active matrix panel 13, as described above, is manufactured such as shown in FIG. 5.

(a) A chromium layer 41 with the thickness of 100 nm is sedimented on the glass substrate 12 by a sputtering method (b) The above-mentioned chromium layer 41 is patterned by etching, and the gate electrodes 26b and 27b and the light shielding electrode 28 are formed. The above-mentioned gate electrodes 26b and 27b compose the gate line 23 in a cross section which is not shown in figures. The light shielding electrode 28 composes a wiring pattern at the anode side of the photodiode 25.

(c) An ITO layer 42, which is a transparent electrode with the thickness of 100 nm, is sedimented on the glass substrate 12 by a sputtering method.

(d) The ITO layer 42 is patterned by etching, and the transparent pixel electrode 24 is formed.

(e) After the gate insulation film 43 with the thickness of 400 nm, which is composed of $SiN_x$ (for example, $Si_3N_4$) or $SiO_2$, is sedimented by a plasma CVD method, the part above the light shielding electrode 28 and the part above a contact part 24a with the drain electrode 26c in the transparent pixel electrode 24 are removed by etching.

(f) After an amorphous silicon (a-Si) layer with the thickness of 100 nm is sedimented by a plasma CVD method, and a polycrystalline silicon (p-Si) layer is formed by crystaining with a excimer laser, the layer is patterned by etching, and the semiconductor layers 26d and 27d for the TFT(L) 26 and the TFT(D) 27 and the semiconductor layer 25a for the photodiode 25 are formed.

The above-mentioned semiconductor layer 26d is formed into n-channel by injecting such impurity as phosphorus with the method of ion implantation or ion shower, while the semiconductor layer 27d and the semiconductor layer 25a are formed into p-channel by injecting such impurity as boron. In this case, the semiconductor layer 26d with n-channel and the semiconductor layer 27d and the semiconductor layer 25a with p-channel may be manufactured separately with two practices instead of injecting the impurities selectively.

(g) Like the above-mentioned semiconductor layer 26d, 27d and 25a, the ohmic layers 26e and 27e with the thickness of 50 nm are formed on a source field and a drain field in the semiconductor layers 26d and 27d. The photodiode 25 is composed in the formation of the ohmic layer 25b of p-Si with $n^+$ on the semiconductor layer 25a.

(h) After an aluminium layer with the thickness of 700 nm is sedimented by a sputtering method, the layer is patterned by etching, and the TfT(L) 26 and the TFT(D) 27 are composed in the formation of the source electrodes 26a and 27a, and the drain electrodes 26c and 27c.

The above-mentioned source electrodes 26a and 27a compose the source line 22 in a cross section which is not shown in figures. The drain electrode 26c of the TFT(L) 26 is connected to the contact part 24a in the above-mentioned transparent pixel electrode 24, while the drain electrode 27c of the TFT(D) 27 is connected to the ohmic layer 25b of the photodiode 25.

Lastly, a passivation film 44 is formed on the source electrode 26a, the drain electrode 26c, the semiconductor layer 26d and the like.

In the above-mentioned manufacturing method, the display and read part 21 is chiefly described. In the case of using the polycrystalline silicon process as described above, particularly, transistors and wiring which compose the driver circuit part 31 can easily be manufactured in the same process at the same time. Meanwhile, in the case of using the amorphous silicon process, the driver circuit part 31 may be composed in the direct provision of driver IC on the glass substrate 12 or in the provision of another substrate by using a flexible substrate.

(4) The Operation While Displaying a Picture

After the pulse of the horizontal synchronizing signal H synk is input to the shift register 34, the pulse is synchronized with the horizontal clock H ck, and the display picture data of each pixel is input to the line memory 35a, and the line memory 35a holds the display picture data for one horizontal scanning line sequentially, and the D/A converter 35b outputs the voltage according to each of the display picture data to each source line 22.

After the pulse of the vertical synchronizing signal V synk is input to the shift register 32, the vertical clock V ck (the horizontal synchronizing signal H synk) is input, and the TFT selection signal for directing the selection of the TFT(L) 26 is input to the TFT control circuit 33, and the TFT control circuit 33 outputs the drive pulse with the voltage of $V_L$ (positive) to the gate line 23 corresponding to the first horizontal scanning line.

Then, each TFT(L) 26 which is connected to the above-mentioned gate line 23 is made the ON state, and electric field is formed by storing electric charge according to the voltage, which is output from the D/A converter 35b, between each transparent pixel electrode 24 and each transparent opposite electrode 15. That is, the liquid crystal layer 14 corresponding to each transparent pixel electrode 24 rotates a polarizing plane of light from the backlight 18, and is made a transmission state with luminance according to each of the display picture data. This state is kept till, the drive pulse is impressed again on the same gate line 23 in the next field.

As described above, the voltage according to the display picture data may be synchronized with the horizontal clock H ck and may be output sequentially at each pixel in one horizontal scanning line without being output to each source line 22 simultaneously.

The picture for one screen is displayed by executing similar operation on each horizontal scanning line every time the horizontal synchronizing signal H synk is input.

(5) The Operation While Reading a Picture

When an original is put on the liquid crystal display device and a picture read switch which is not shown in figures is operated in such state that the putting of the original is detected by the touch panel unit 19, the read of an original picture is executed as shown in the following Table 1A and below.

TABLE 1A

| | pixel electrode charge | photodiode charge | exposure | readout |
|---|---|---|---|---|
| gate voltage Vg | $V_L(+)$ | $V_D(-)$ | (0) | $V_D(-)$ |
| TFT(L) 26 | ON | OFF | OFF | OFF |
| TFT(D) 27 | OFF | ON | OFF | ON |
| source voltage Vs | $V_{sLmax}$ | $V_{sD}$ | — | — |
| liquid crystal layer 14 | arbitrary → transmission | transmission | transmission | transmission |
| backlight 18 | arbitrary | turn off | turn on | turn off |

(a) The liquid crystal layer 14 corresponding to all pixels is made a transmission state by the same operation as in displaying the picture described above.

That is, the TFT selection signal for directing the selection of the TFT(L) 26 TFT input to the TFT control circuit 33, and the TFT(L) 26 is made the ON state by outputting the gate voltage Vg=$V_L$ (positive) from the TFT control circuit 33 to the gate line 23, and the source voltage Vs=$V_{sLmax}$ corresponding to maximal luminance is output from the D/A converter 35b to the source line 22, and the electric charge is stored between the transparent pixel electrode 24 and the transparent opposite electrode 15, and the liquid crystal layer 14 is made a transmission state.

(b) A predetermined electric charge is stored at the photodiode 25 by the operation wherein the gate voltage Vg and the source voltage Vs are different from in displaying the picture described above.

That is, the TFT selection signal for directing the selection of the TFT(D) 27 is input to the TFT control circuit 33, and the TFT(D) 27 is made the ON state by outputting the gate voltage Vg=$V_D$ (negative) from the TFT control circuit 33 to the gate line 23, and the data corresponding to the predetermined source voltage Vs=$V_{sD}$ for impressing on the photodiode 25 is input to the line memory 35a as the display picture data, and the above-mentioned predetermined source voltage Vs=$V_{sD}$ is output from the D/A converter 35b to the source line 22. Then, the photodiode 25 is made the impressed state of the reverse bias voltage, whereby the predetermined electric charge is stored.

The backlight 18 is turned offby at least this point of time.

(c) When the backlight 18 is turned on for a predetermined time, the light emitted from the backlight 18 is irradiated to an original through the liquid crystal layer 14, and the photodiode 25 is exposed to the reflected light.

Then, electric charge which cancels the stored electric charge is generated at the photodiode 25 according to the quantity of entered light, and the quantity of the stored electric charge decreases. That is, more quantity of the stored electric charge decreases in the part with higher lightness power density) of an original picture, while less quantity of the stored electric charge decreases in the part with lower lightness (higher density).

(d) After the backlight 18 is turned off, like the above-mentioned (b), the gate voltage Vg=VD (negative) is output from the TFT control circuit 33 to the gate line 23, and the TFT(D) 27 is made the ON state. At this moment, the output of the D/A converter 35b in the charging voltage output circuit 35 is kept in a high impedance state.

Then, the A/D converter 36a outputs the read picture data according to the decreasing quantity of the stored electric charge at the photodiode 25 to the line memory 36b, and the line memory 36b holds the read picture data of each pixel for one horizontal scanning line for the time being, and outputs the above-mentioned read picture data sequentially, according to the timing signal from the shift register 34.

In the above-mentioned example, it is indicated that the liquid crystal layer 14 is made the transmission state under the action of electric field by means of using the liquid crystal with a negative dielectric constant anisotropy as the liquid crystal layer 14 as well as arranging the polarizing filter layer 11 and the polarizing filter layer 17 in such direction (crossed nicols) that the polarized direction of one of the polarizing filter layers and the oriented direction of the liquid crystal are parallel to each other and the polarized directions of both polarizing filter layers 11 and 17 are orthogonal to each other, and it is similar to use a liquid crystal with a positive dielectric constant anisotropy as well as arrange the polarizing filter layer 11 and the polarizing filter layer 17 in such direction (parallel nicols) that an oriented direction of the liquid crystal and polarized directions of both polarizing filter layers 11 and 17 are parallel to each other.

Thus, when the liquid crystal layer 14 is composed so as to be made the transmission state under the action of electric field, it is also possible to equalize the voltage VsLmax impressed on the transparent pixel electrode 24 and the voltage VD impressed on the photodiode 25, and particularly, when these source voltages Vs are provided directly by a predetermined power supply not depending on the D/A converter 35b, it is an advantage that the simplification of circuits is facilitated by reducing the kinds of power supply.

Meanwhile, a twisted nematic liquid crystal of a right angle with a negative dielectric constant anisotropy may be used as well as the polarizing g filter layer 11 and the polarizing filter layer 17 may be arranged in such direction (parallel nicols) that the polarized directions are parallel, or a liquid crystal with a positive dielectric constant anisotropy may be used as well as the polarizing filter layer 11 and the polarizing filter layer 17 may be arranged in such direction (crossed nicols) that the polarized directions are orthogonal. That is, in this case, since the liquid crystal layer 14 is made a transmission state under no action of electric field, it is preferred to impress Vs=VsLmin instead of the above-mentioned source voltage Vs=VsLmax and discharge stored electric charge between the transparent pixel electrode 24 and the transparent opposite electrode 15.

Although it is exemplified that the backlight 18 is turned off except the occasion of exposure, the backlight 18 may be kept on when sufficient electric charge can be stored at the photodiode 25 even in the state of turning on. However, in this case, since discharging begins as soon as each TFT(D) 27 is made an OFF state, it is necessary to equalize exposure time of each photodiode 25 by executing readout or making the liquid crystal layer 14 a shielding state for the time being at equal delay time from the point of time when each TFT(D) 27 is made the OFF state. Nevertheless, the accurate control of exposure time is facilitated as compared with the case of turning on and off the backlight 18.

Moreover, as shown in the following Table 2A, the liquid crystal layer 14 may be made a transmission state after storing electric charge at the photodiode 25. In this case as well, the backlight 18 may be kept on if the effect of making the liquid crystal layer 14 a shielding state is satisfactory. However, in the case, as described above, it is necessary to equalize the exposure time of each photodiode 25. Meanwhile, when electric charge is stored at the photodiode 25 in the state of turning off the backlight 18 and there is little influence of transmitted light through the back of an original which is put on, as shown in Table 2A, it is not always necessary to keep the liquid crystal layer 14 in the shielding state when the electric charge is stored at the photodiode 25.

TABLE 2A

| | photodiode charge | pixel electrode charge | exposure | readout |
|---|---|---|---|---|
| gate voltage Vg | VD(−) | VL(+) | (0) | VD(−) |
| TFT(L) 26 | OFF | ON | OFF | OFF |
| TFT(D) 27 | ON | OFF | OFF | ON |
| source voltage Vs | VsD | VsLmax | — | — |
| liquid crystal layer 14 | shielding | transmission | transmission | transmission |
| backlight 18 | turn off | turn off | turn on | turn off |

Each of the above-mentioned composition materials, the order of each step in a manufacturing process, process conditions and the like are mere examples, and this embodiment is not limited to these examples.

(Variant Example of Embodiment 1)

An example of a liquid crystal display device with a function of reading a picture, wherein the crosstalk can be reduced and the resolution of reading a picture can be improved since the light from adjacent pixels never enters by irradiating the light of the backlight 18 to an original at each single pixel or each set of pixels which are not adjacent to each other and reading an original picture, is described as Variant Example of the above-mentioned Embodiment 1.

That is, although it is exemplified in Embodiment 1 that the read of picture data is executed by executing, for all pixels, one cycle operation comprising the storage of electric charge at the photodiode 25 and the exposure of the photodiode 25 and the output of the picture data, the picture data may be read by repeating the operation in the above-mentioned cycle at each pixel. In the former case, since the read of the picture data is executed by the operation in one cycle described above, high reading rate is obtained, while in the latter case, since the light from the backlight 18 is irradiated to an original at each pixel, the crosstalk is prevented which is caused since reflected light from peripheral pixels in the original enters the photodiode 25, and thereby high resolution is easily obtained The picture data may be read by repeating the operation in the above-mentioned cycle at each pixel for one line along one source line 22 (or gate line 23). In this case, since the crosstalk is prevented in the direction which is vertical to the above-mentioned source line 22 (or gate line 23), the resolution can be raised to some extent and the reading rate can be accelerated comparatively. Furthermore, high resolution and high reading rate can be intended by repeating the operation in the above-mentioned cycle at every three or more pixels, or each of the pixels on every two lines.

This liquid crystal display device is composed similarly to Embodiment 1 and differently, chiefly, in the control operation of the control part 71 while reading a picture. The operation while reading the picture is described below. Detailed descriptions as regards the components with the same function as the above-mentioned Embodiment 1 is omitted hereinafter by assigning the same numbers to those components.

When an original is put on the liquid crystal display device and a picture read switch which is not shown in figures is operated in such state that the putting of the original is detected by the touch panel unit 19, the read of an original picture is executed as shown in the following Table 1B and below.

TABLE 1B

|  | pixel electrode charge | photodiode charge | exposure | readout |
|---|---|---|---|---|
| gate voltage Vg |  |  |  |  |
| TFT(L) 26 | VL(+) | VD(−) | (0) | VD(−) |
| TFT(D) 27 | ON | OFF | OFF | OFF |
|  | OFF | ON | OFF | ON |
| source voltage Vs | pixel P1:VsLmax pixel P2:VsLmin | VsD | — | — |
| liquid crystal layer 14 | pixel P1: transmission pixel P2: shielding | pixel P1: transmission pixel P2: shielding | pixel P1: transmission pixel P2: shielding | pixel P1: transmission pixel P2: shielding |
| backlight 18 | arbitrary | turn off | turn on | turn off |

Figure 6A:
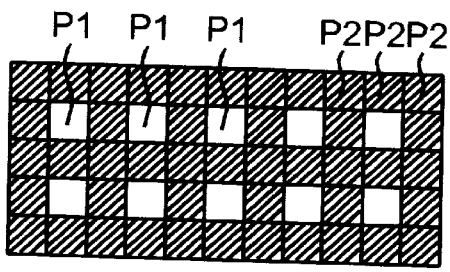
FIGS. 6(a)–(g) is a description view showing an arrangement of pixels wherein an original picture is read in one exposing process in Variant Example of Embodiment 1.

(a) By means of the same operation as in displaying a picture in Embodiment 1, as shown in FIG. 6(a), the liquid crystal layer 14 corresponding to every two pixels P1 vertically and horizontally is made a transmission state, while the liquid crystal layer 14 corresponding to a pixel P2 adjacent to the pixel P1 is made a shielding state.

That is, the TFT selection signal for directing the selection of the TFT(L) 26 is input to the TFT control circuit 33, and each TFT(L) 26 is made an ON state sequentially by outputting the gate voltage Vg=VL (positive) sequentially from the TFT control circuit 33 to each gate line 23, and the source voltage Vs=VsLmax corresponding to maximal luminance as regards the pixel P1 and a source voltage Vs=VsLmin corresponding to minimal luminance as regards the pixel P2 are output from the D/A converter 35b to the source line 22 in synchronization with the output of the above-mentioned gate voltage Vg, and electric charge is stored or discharged between the transparent pixel electrode 24 and the transparent opposite electrode 15, and only the liquid crystal layer 14 at the pixel P1 is made the transmission state.

(b) The predetermined electric charge is stored at the photodiode 25 corresponding to the pixel P1 by the operation wherein the gate voltage Vg and the source voltage Vs are different from in displaying the picture described above. That is, the TFT selection signal for directing the selection of the TFT(D) 27 is input to the TFT control circuit 33, and the TFT(D) 27 is made an ON state by outputting the gate voltage Vg=VD (negative) from the TFT control circuit 33 to the gate line 23, and the data corresponding to the predetermined source voltage Vs=VsD for impressing on the photodiode 25 is input to the line memory 35a as the display picture data, and the above-mentioned predetermined source voltage Vs=VsD is output from the D/A converter 35b to the source line 22. Then, the photodiode 25 is made the impressed state of the reverse bias voltage, whereby the predetermined electric charge is stored.

The backlight 18 is turned off by at least this point of time.

The simplification of control may be intended by storing electric charge also at the photodiode 25 corresponding to the pixel P2. Meanwhile, the time for storing electric charge can be shortened by storing electric charge only at the pixel P1. In the latter, for further details, it is preferred to provide two shift registers, each of which is connected to the gate lines 23 in order of odd numbers or even numbers and to which vertical synchronizing signals V synk with the gap of phase by half cycle are input while displaying a picture, for example, instead of the shift register 32, and to input a vertical synchronizing signal V synk only to one of those shift registers while storing electric charge at the photodiode 25.

(c) When the backlight 18 is turned on for a predetermined time, the light emitted from the backlight 18 is irradiated to an original only through the liquid crystal layer 14 at the pixel P1, and the photodiode 25 at the pixel P1 is exposed to the reflected light.

Then, electric charge which cancels the stored electric charge is generated at the photodiode 25 according to the quantity of entered light, and the quantity of the stored electric charge decreases. That is, more quantity of the stored electric charge decreases in the part with higher lightness lower density) of an original picture, while less quantity of the stored electric charge decreases in the part with lower lightness (higher density).

As described above, since the reflected light from adjacent pixels in an original picture never enters the photodiode 25 by irradiating the light emitted from backlight to the original only through the liquid crystal layer 14 at the pixel P1, the crosstalk with adjacent pixels is reduced and the resolution is improved (d) After the backlight 18 is turned off, like the above-mentioned (b), the gate voltage Vg=VD (negative) is output from the TFT control circuit 33 to the gate line 23, and the TFT(D) 27 is made the ON state. At this moment, the output of the D/A converter 35b in the charging voltage output circuit 35 is kept in a high impedance state.

Then, the A/D converter 36a outputs the read picture data according to the decreasing quantity of the stored electric charge at the photodiode 25 to the line memory 36b, and the line memory 36b holds the read picture data of each pixel for one horizontal scanning line for the time being, and outputs the above-mentioned read picture data sequentially, according to the timing signal from the shift register 34.

Indefinite picture data are output as regards the pixel P2. However, picture data may be output at all pixels and only picture data at the pixel P1 may be extracted by data processing later, the drive pulse may be output from the TFT control circuit 33 only to the gate line 23 corresponding to the pixel P1, and A/D conversion and the retention and output of picture data may be executed selectively in the read circuit 36 only as regards the pixel P1.

(e) The read of an original picture at all pixels is executed by repeating the above-mentioned operation of (a)–(d) at each of three pixels which are adjacent to the pixel P1.

Figure 6B:
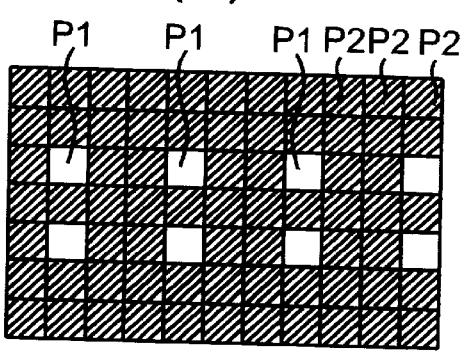
Figure 6C:
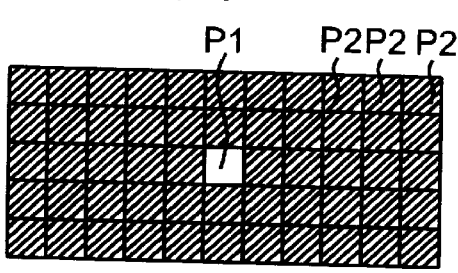
Figure 6D:
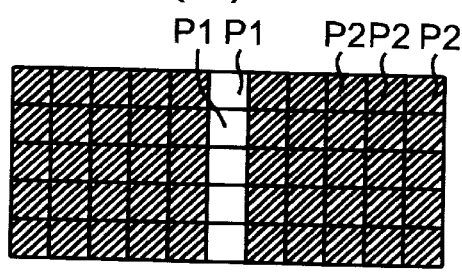
Figure 6E:
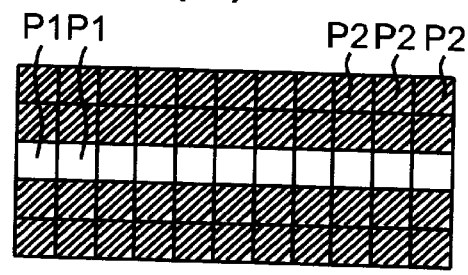
Figure 6F:
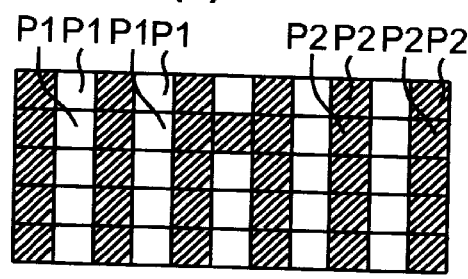
Figure 6G:
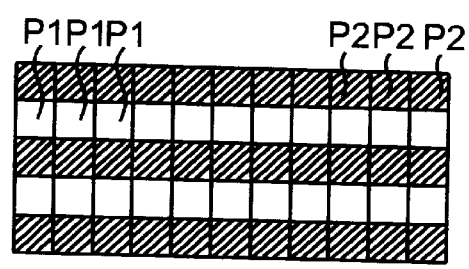

Although it is indicated in the above-mentioned example that the original picture are read at each set of every two pixels P1 as shown in FIG. 6(a), the crosstalk with adjacent pixels may be reduced further by reading at each set of every three or more pixels P1 as shown in FIG. 6(b), for example, according to pixel density. The read operation may be repeated at each pixel P1 as shown in FIG. 6(c). In this case, it takes somewhat longer time to read the whole original picture because of more repetition of the read operation, however, the resolution can be easily raised with certainty by mostly preventing the crosstalk with other pixels even in the case of high pixel density. Moreover, the read operation may be executed at each set of pixels for one line along one source line 22 or gate lane 23 as shown in FIGS. 6(d)(e), and the read operation may be executed at each set of pixels for a plurality of lines along every two or more source lines 22 or gate lines 23 as shown in FIGS. 6(f)(g). In these cases, since the crosstalk is prevented in a direction which is vertical to the above-mentioned source line 22 or gate line 23, the resolution can be raised to some extent and the reading rate can be accelerated comparatively.

The liquid crystal layer 14 may be made a transmission state after storing electric charge at the photodiode 25, as shown in the following Table 2B, at each set of pixels which are not adjacent to each other.

TABLE 2B

|  | photodiode charge | pixel electrode charge | exposure | readout |
|---|---|---|---|---|
| gate voltage Vg | VD(−) | VL(+) | (0) | VD(−) |
| TFT(L) 26 | OFF | ON | OFF | OFF |
| TFT(D) 27 | ON | OFF | OFF | ON |
| source voltage Vs | VsD | pixel P1:VsLmax pixel P2:VsLmin | — | — |
| liquid crystal layer 14 | pixel P1: shielding pixel P2: shielding | pixel P1: transmission pixel P2: shielding | pixel P1: transmission pixel P2: shielding | pixel P1: transmission pixel P2: shielding |
| backlight 18 | turn off | turn off | turn on | turn off |

(Embodiment 2)

An example having an staggered type TFT, wherein the gate electrodes 26b and 27b are provided above the semiconductor layers 26d and 27d as well as the TFT(L) 26 and the TFT(D) 27 are formed on the light shielding electrode 28, is described as another example of the active matrix panel 13 which composes a liquid crystal display device with a function of reading a picture.

Figure 7:
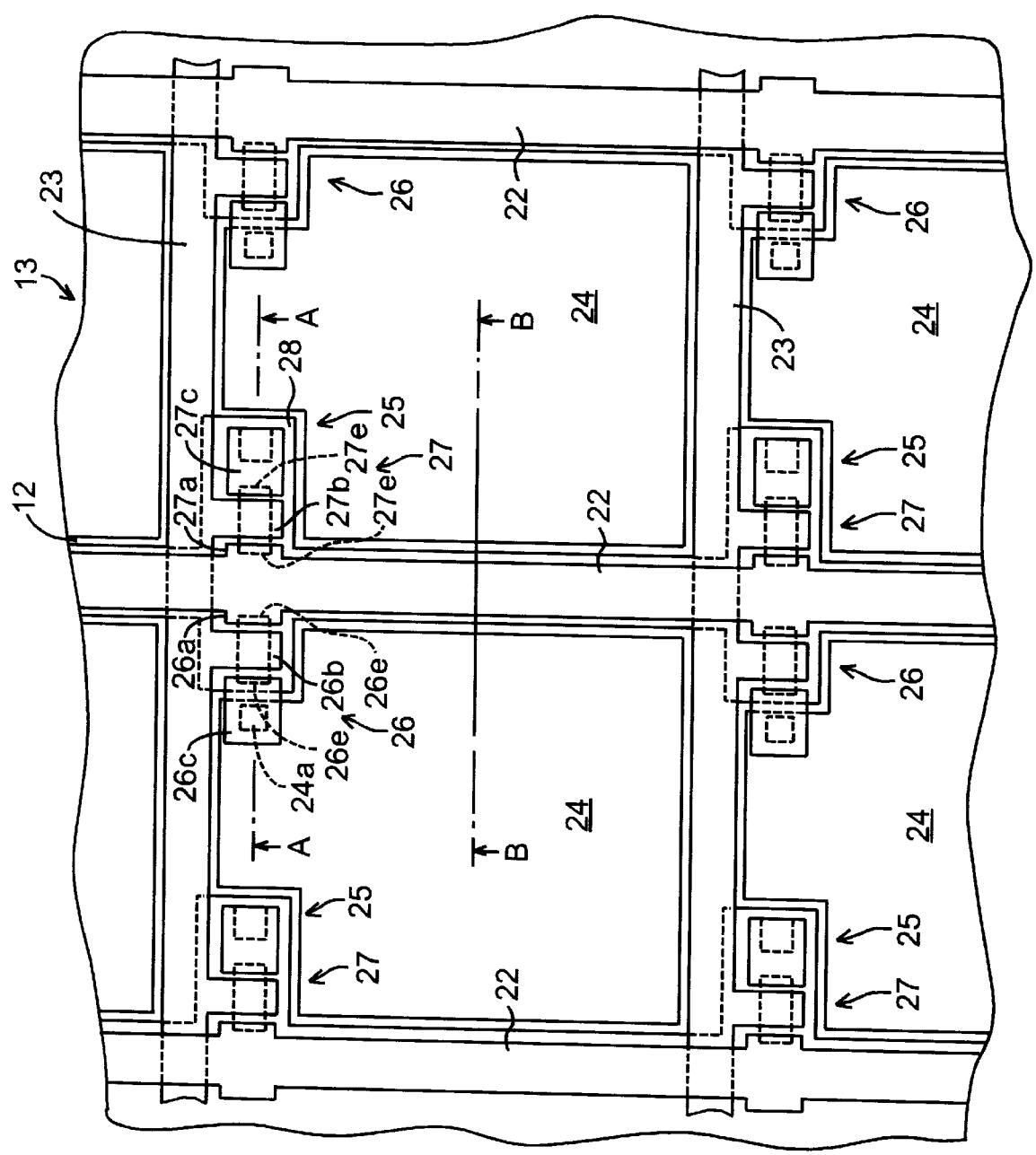
FIG. 7 is a plan view showing a concrete constitution of an active matrix panel 13 in Embodiment 2.

The light shielding electrode 28 is formed on the glass substrate 12 as shown in FIGS. 7 and 8, and the semiconductor layers 26d and 27d of the TFT(L) 26 or the TFT(D) 27 are formed on the light shielding electrode 28 through an insulation film 29 which is composed of, for example, $SiO_2$. The semiconductor layer 25a of the photodiode 25 is formed directly on the light shielding electrode 28 like Embodiment 1, and the light shielding electrode 28 composes a wiring pattern at the anode side.

The ohmic layers 26e and 27e, the source electrodes 26a and 27a, and the drain electrodes 26c and 27c are formed above the semiconductor layers 26d and 27d, and the gate electrodes 26b and 27b are formed through the gate insulation film 43 on them.

Thus, since a liquid crystal display device with a function of reading a picture can be manufactured in the same process as ordinary liquid crystal display devices by composing the wiring pattern of the photodiode 25 with the light shielding electrode 28, the decrease of manufacturing cost can be intended easily.

(Embodiment 3)

An example, wherein both TFT(L) 26 and TFT(D) 27 are formed into TFTs with n-channel, and a threshold voltage VLO of a gate at the TFT(L) 26 is determined higher than a threshold voltage VDO of a gate at the TFT(D) 27, is described That is, only the TFT(D) 27 is made an ON state when the gate voltage Vg which satisfies VDO<Vg<VLO is impressed on the gate line 23, while both TFTP(L) 26 and TFT(D) 27 are made the ON state when the gate voltage Vg which satisfies VLO<Vg is impressed. Such determination of the threshold voltage can be executed by various publicly known means, for example, the density is controller while injecting such impurity as phosphorus into the semiconductor layers 26d, and 27d.

In a liquid crystal display device with a function of reading a picture comprising the above-mentioned TFT(L) 26 and TFT(D) 27, the read of an original picture is executed as shown in the following Table 3A and below.

TABLE 3A

|  | pixel electrode charge | photodiode charge | exposure | readout |
|---|---|---|---|---|
| gate voltage Vg | VLO < Vg | VDO < Vg < VLO | Vg < VDO | VDO < Vg < VLO |
| TFT(L) 26 | ON | OFF | OFF | OFF |
| TFT(D) 27 | (ON) | ON | OFF | ON |
| source voltage Vs | VsLmax | VsD | — | — |
| liquid crystal layer 14 | arbitrary → transmission | transmission | transmission | transmission |
| backlight 18 | arbitrary | turn off | turn on | turn off |

(a) When the gate voltage Vg which satisfies VLO<Vg is output to the gate line 23, the TFT(L) 26 is made an ON state, and by means of the source voltage Vs=VsLmax which is output to the source line 22 at that moment, electric charge is stored between the transparent pixel electrode 24 and the transparent opposite electrode 15, and the liquid crystal layer 14 corresponding to all pixels is made a transmission state.

On the occasion, since the TFT(D) 27 is also made the ON state and electric charge is stored similarly at the photodiode 25 by the source voltage Vs=VsLmax, the following step of storing the electric charge only at the photodiode 25 can be omitted in the case of VsLmax=VsD.

(b) When the gate voltage Vg which satisfies VDO<Vg<VLO is output to the gate line 23, only the TFT(D) 27 is made an ON state, therefore, the storage of a predetermined electric charge is executed by the voltage VsD which is different from the above-mentioned source voltage Vs=VsLmax.

The backlight 18 is turned off by at least this point of time.

(c) When the backlight 18 is turned on for a predetermined time as well as both TFT(L) 26 and TFT(D) 27 are made an OFF state by outputting the gate voltage Vg which satisfies Vg<VDO to the gate line 23, the light emitted from the backlight 18 is irradiated to an original through the liquid crystal layer 14, and the photodiode 25 is exposed to the reflected light, and the photodiode 25 has the quantity of stored electric charge according to the density of an original picture.

(d) After the backlight 18 is turned off, like the above-mentioned (b), the gate voltage Vg which satisfies VDO<Vg<VLO is output to the gate line 23, and only the TFT(D) 27 is made an ON state, and read picture data are obtained.

In also this Embodiment 3, as described in the above-mentioned Embodiment 1, the backlight 18 may be kept on by executing the readout of picture data at the same timing as in storing electric charge, and equalizing exposure time of each photodiode 25.

In such composition as Embodiment 3, while displaying a picture, namely, whenever the TFT(L) 26 is made an ON state, the TFT(D) 27 is also made an ON state. However, if electric potential at the anode side of the photodiode 25 is ordinarily kept at ground electric potential, a display picture are hardly affected since the reverse bias voltage is merely impressed on the photodiode 25 and electric current hardly flows.

Figure 9:
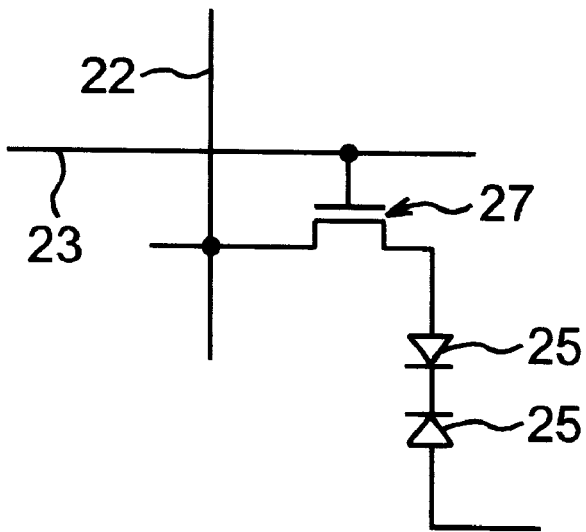
FIG. 9 is a circuit diagram showing a variant example (another example of a connection of photodiode 25) of a liquid crystal display device with a function of reading a picture in Embodiment 3.

Thus, if the reverse bias voltage is impressed on the photodiode 25, it is possible to apply such publicly known means that a polarity of the source voltage Vs is reversed at each horizontal scanning period and is reversed on each of the source lines 22 which are adjacent to each other in order to intend the improvement of the picture quality by keeping flickerless in displaying a picture. That is, in this case, it is preferred to connect the photodiode 25 of each pixel so as to be made the reverse bias according to the impressed source voltage Vs, and, as shown in FIG. 9, to connect the photodiode 25 so as to be made the reverse bias whichever the source voltage Vs is positive or negative.

It is possible to contribute to the improvement of response speed of a display by impressing a negative voltage on the anode side of the photodiode 25.

Figure 10:
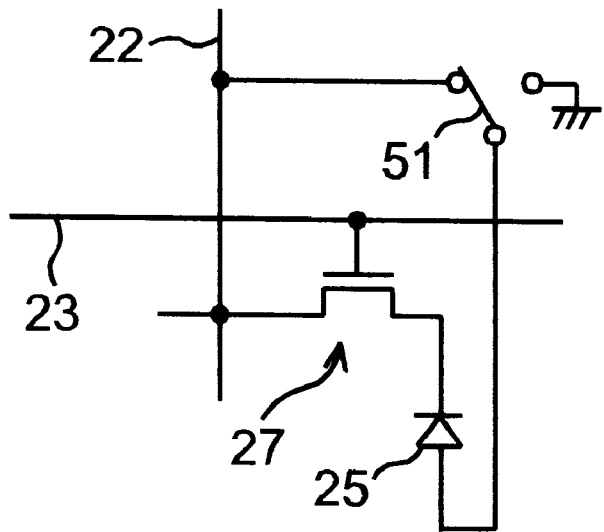
FIG. 10 is a circuit diagram showing another variant example (an example of impressing a source voltage on an anode side of photodiode 25) of a liquid crystal display device with a function of reading a picture in Embodiment 3.

As shown in FIG. 10, in displaying a picture, if the source voltage Vs is impressed on the anode side of the photodiode 25 by providing a transfer switch 51, a display picture can not be affected at all theoretically. In this case, when a wiring which is connected to the anode side of the photodiode 25 is provided independently on each source line 22, or the wirings at all anode sides are made common, it is preferred to impress the source voltage Vs selectively in sequence from the charging voltage output circuit 35 to each source line 22 and, meanwhile, make other source lines 22 a high impedance state.

Figure 11A:
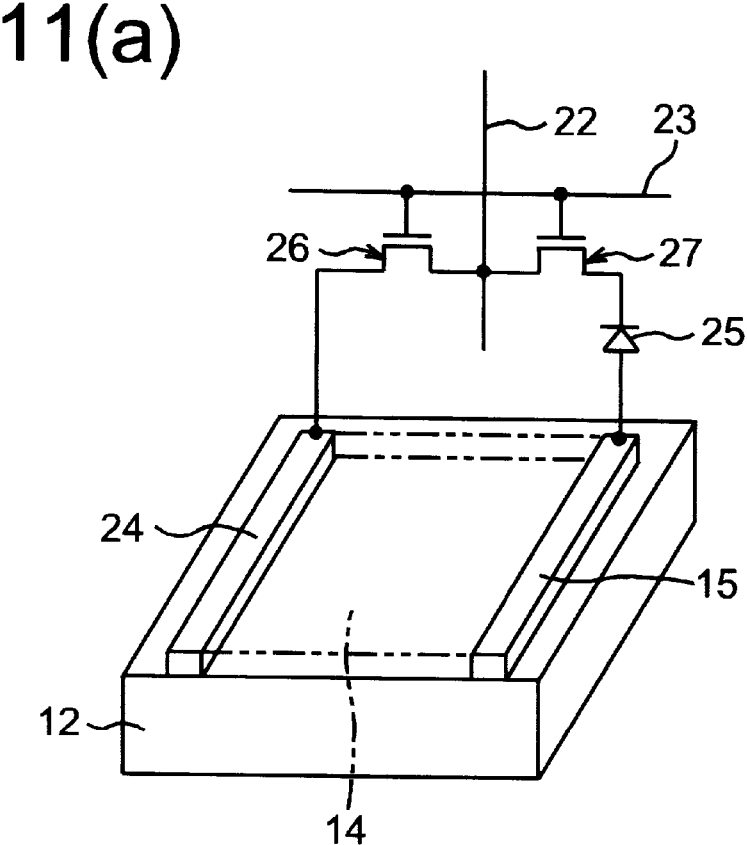
FIG. 11 is a description view showing an example in the case of composing an in-plane switching system liquid crystal display device.
Figure 11B:
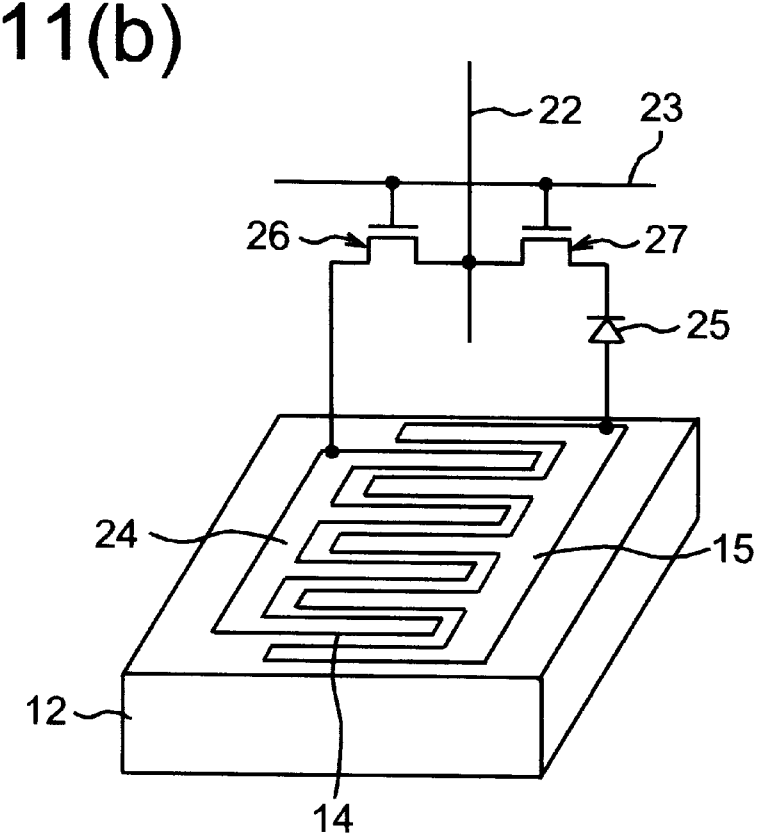

In each of the above-mentioned Embodiments, it is exemplified that transparent opposite electrode 15 is formed on an opposite glass substrate 16. However, unlimited to this, such as schematically shown in FIG. 11, each of the above-mentioned Embodiments can be applied likewise to a liquid crystal display device in so-called in-plane switching system (IPS) wherein the transparent pixel electrode 24 and the transparent opposite electrode 15 are provided on the same substrate. In this case, the above-mentioned transparent opposite electrode 15 may be used as the wiring at the anode side of the photodiode 25.

Since the storage of electric charge between the transparent pixel electrode 24 and the transparent opposite electrode 15 or at the photodiode 25 in reading a picture is executed by impressing an equal voltage on all pixels differently from in displaying the picture ordinarily, electric charge may be stored by outputting the drive pulse to all gate lines 23 at the same time.

Various charge-storage type photo detectors as well as the photodiode 25 are applicable to a photo detector. Moreover, an original picture can be read likewise even if a photo sensor except the charge-storage type is used. In this case, the step of storing electric charge prior to exposure is not necessary, and a detector for the voltage at both ends of the photo detector and a detector for electric current which flows in the photo detector can be used as the A/D converter 36a.

The display and read of a picture may be executed at the same time by dividing into a display field and a read field as well as may be executed separately by covering the whole screen. That is, as described above, when the backlight 18 is composed so as to be kept on or the length during which the backlight 18 is off is determined shortly, the display and read of the picture can be executed by executing the above-mentioned picture display operation and picture read operation in each field. Furthermore, the above-mentioned read field of the picture may be determined beforehand, and a field where the putting of an original is detected by the touch panel unit 19 may be made the read field.

(Variant Example of Embodiment 3)

An example of a liquid crystal display device with a function of reading a picture, wherein the crosstalk can be reduced since the light from adjacent pixels never enters by irradiating the light of the backlight 18 to an original at each single pixel or each set of pixels which are not adjacent to each other and reading an original picture, is described as Variant Example of the above-mentioned Embodiment 3.

This liquid crystal display device is composed similarly to Embodiment 3 and differently, chiefly, in the control operation of the control part 71 while reading a picture. The operation while reading the picture is described below by referring to the following Table 3B.

TABLE 3B

|  | pixel electrode charge | photodiode charge | exposure | readout |
|---|---|---|---|---|
| gate voltage Vg | VLO < Vg | VDO < Vg < VLO | Vg < VDO | VDO < Vg < VLO |
| TFT(L) 26 | ON | OFF | OFF | OFF |
| TFT(D) 27 | (ON) | ON | OFF | ON |
| source voltage Vs | pixel P1:VsLmax pixel P2:VsLmin | VsD | — | — |
| liquid crystal layer 14 | pixel P1: transmission pixel P2: shielding | pixel P1: transmission pixel P2: shielding | pixel P1: transmission pixel P2: shielding | pixel P1: transmission pixel P2: shielding |
| backlight 18 | arbitrary | turn off | turn on | turn off |

(a) When the gate voltage Vg which satisfies VLO<Vg is output to the gate line 23, the TFT(L) 26 is made an ON state, and by means of the source voltage Vs=VsLmax (or VsLmax) which is output to the source line 22 at that moment, electric charge is stored or discharged between the transparent pixel electrode 24 and the transparent opposite electrode 15, and the liquid crystal layer 14 corresponding to the pixels P1 for reading a picture is made a transmission state, while the liquid crystal layer 14 corresponding to other pixels P2 is made a shielding state.

On the occasion, since the TFT(D) 27 is also made the ON state and electric charge is stored similarly at the photodiode 25 by the source voltage Vs=VsLmax, the following step of storing the electric charge only at the photodiode 25 can be omitted in the case of VsLmax=VsD.

(b) When the gate voltage Vg which satisfies VDO<Vg<VLO is output to the gate line 23, only the TFT(D) 27 is made an ON state, therefore, the storage of a predetermined electric charge at the photodiode 25 corresponding to at least the pixels P1 for reading the picture is executed similarly to Embodiment 1 by the voltage VsD which is different from the above-mentioned source voltage Vs=VsLmax.

The backlight 18 is turned off by at least this point of time.

(c) When the backlight 18 is turned on for a predetermined time as well as both TFT(L) 26 and TFT(D) 27 are made an OFF state by outputting the gate voltage Vg which satisfies Vg<VDO to the gate line 23, the light emitted from the backlight 18 is irradiated to an original through the liquid crystal layer 14, and the photodiode 25 is exposed to the reflected light, and the photodiode 25 has the quantity of stored electric charge according to the density of an original picture.

(d) After the backlight 18 is turned off, like the above-mentioned (b), the gate voltage Vg which satisfies VDO<Vg<VLO is output to the gate line 23, and only the TFT(D) 27 is made an ON state, and read picture data are obtained.

(e) The read of an original picture at all pixels is executed by repeating the above-mentioned operation of (a)–(d) at each of three pixels which are adjacent to the pixel P1.
(Embodiment 4)

An example of a liquid crystal display device, wherein the display and read of color picture can be executed, is described.

Figure 12:
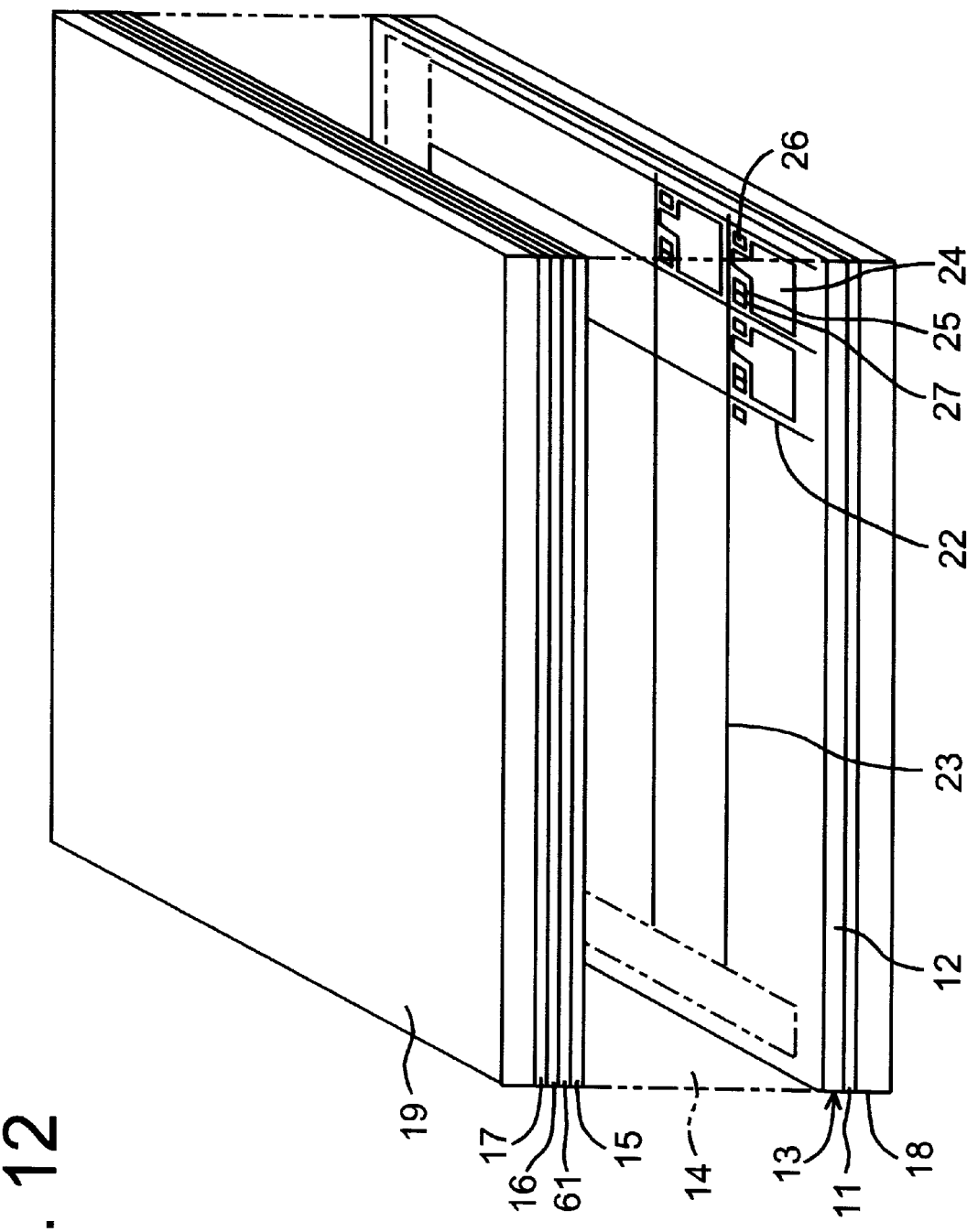
FIG. 12 is a perspective view showing an external constitution of a liquid crystal display device with a function of reading a picture in Embodiment 4.

This liquid crystal display device, as shown in FIG. 12, comprises a micro color filter 61 with a field for transmitting the light of red, green or blue corresponding to each transparent pixel electrode 24 between the opposite glass substrate 16 and the transparent opposite electrode 15. The composition except the micro color filter 61 is similar to the above-mentioned liquid crystal display device in monochrome (Embodiment 1, Embodiment 2, Embodiment 3 and the like).

By means of such composition, the display and read of a color picture are executed by the same operation as the above-mentioned liquid crystal display device in monochrome. That is, when each of picture data in red, blue or green is input as display picture data, a color picture is displayed by an additive process. Color picture data are read since the light of red, blue or green is irradiated to an original through the micro color filter 61 at each transparent pixel electrode 24 and the quantity of reflected light according to a component of each color in an original picture is detected.

Even in the case of composing such liquid crystal display device in color, like the above-mentioned liquid crystal display device in monochrome, since the TFT(L) 26 and the TFT(D) 27 are controlled by common source line 22 and gate line 23, and the gate line exclusive to the TFT(D) 27 are not necessary, effective display area of a picture can be enlarged and high visibility can be obtained.

As described in Variant Example of Embodiment 1 and Variant Example of Embodiment 2, the crosstalk with adjacent pixels can be reduced by irradiating the light from the backlight 18 at each set of every two or more pixels, at each pixel, at each set of pixels for one line, or at each set of pixels in every two or more lines, and reading an original picture.

In this liquid crystal display device, a pixel (color pixel) of a predetermined color is composed by an additive process of the light which is transmitted through each of three transparent pixel electrodes 24. Then, when the pixel density of a pixel (simplex pixel) corresponding to each transparent pixel electrode 24 is equal to the pixel density in a liquid crystal display device in monochrome (for example, when the sizes of the transparent pixel electrode 24 are equal), the pixel density of the color pixel (the pixel density in substantial display and read) is one-third of the pixel density in the liquid crystal display device in monochrome.
(Embodiment 5)

Figure 13:
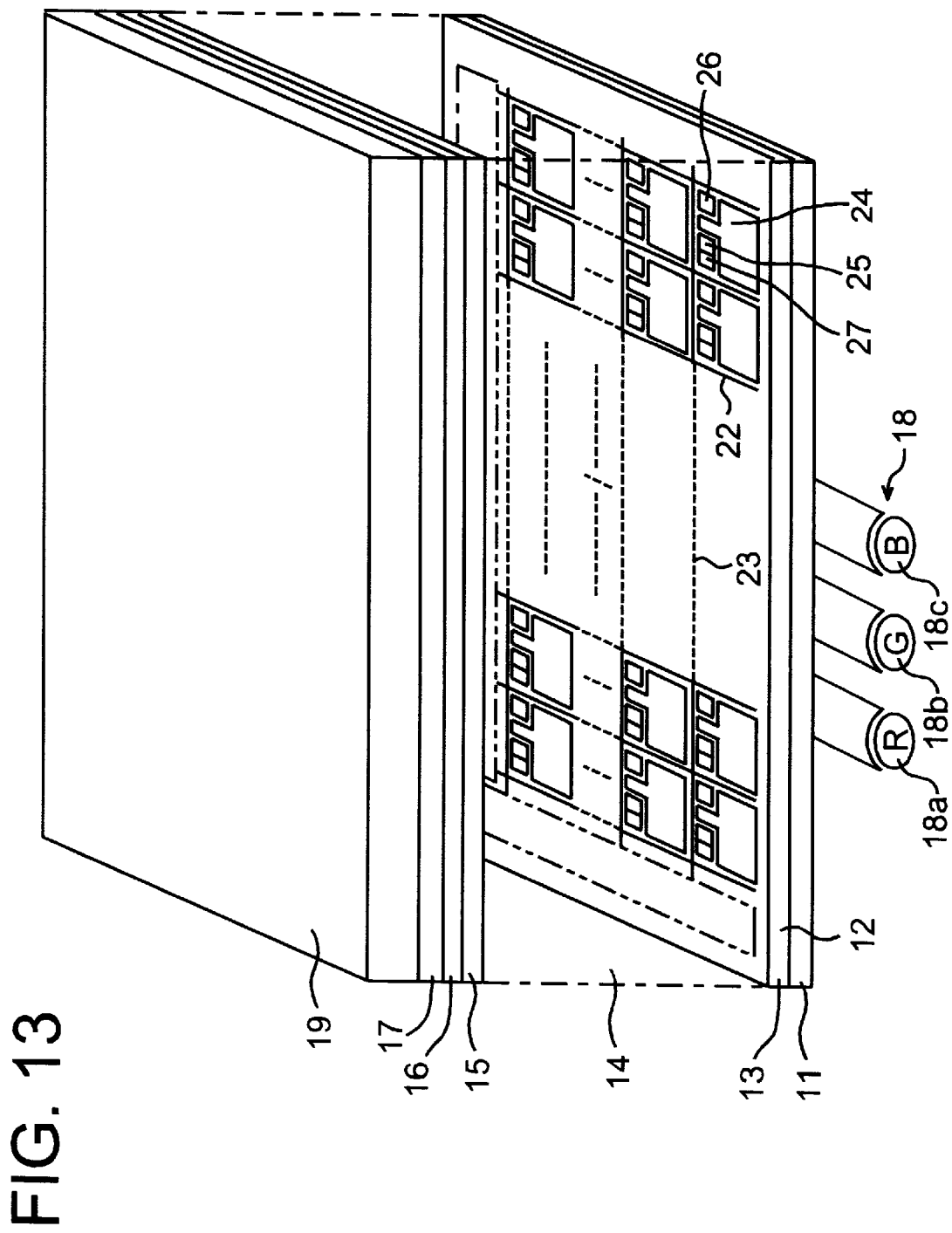
FIG. 13 is a perspective view showing an external constitution of a liquid crystal display device with a function of reading a picture in Embodiment 5.

An example of a liquid crystal display device, wherein the pixel density of a color pixel is equal to that of a simplex pixel, namely, the pixel density of the color pixel which is equal to the pixel density in a liquid crystal display device in monochrome is obtained even if the size of the transparent pixel electrode 24 is equal to the size in the liquid crystal display device in monochrome, is described This liquid crystal display device, as shown in FIG. 13, is composed of the backlight 18 which comprses monochromatic light sources 18a–18c for emitting each monochromatic light of red, blue or green. The turning on and off of these monochromatic light sources 18a–18c are controlled independently by a control part which is not shown in figures. The composition except the backlight 18 is similar to the above-mentioned liquid crystal display device in monochrome.

The operation while displaying a picture and the operation while reading a picture are described below.
(1) The Operation While Displaying a Picture The monochromatic light sources 18a–18c of red, blue and green are turned on selectively in sequence, and the same display operation as the above-mentioned picture display device in monochrome is executed while turning on, based on each of display picture data of red, blue or green. That is, the components of red, blue and green are displayed in a time division at each simplex pixel and the display of a color picture is executed by the afterimage effect of visual sense. Thus, by means of displaying a picture of each color in the time division with the monochromatic light sources 18a–18c, a simplex pixel can function as a color pixel and the pixel density of the color pixel can be equalized to the pixel density of the simplex pixel.
(2) The Operation While Reading a Picture Picture data of the component of each color in an original picture are read by using the monochromatic light sources 18a–18c of red, blue and green sequentially and executing the same read operation as the above-mentioned liquid crystal display device in monochrome at each of the monochromatic light sources 18a–18c. For further details, first, the monochromatic light source 18a of red is used, red light is irradiated to an original through all transparent pixel electrodes 24, and the quantity of reflected light according to red component in the original picture is detected. Next, the monochromatic light source 18b of blue is used, and a picture of blue component is read, and additionally, the monochromatic light sources 18c of green is used, and a picture of green component is read. Thus, color picture data are read by repeating the above-mentioned read operation three times with the use of the monochromatic light sources 18a–18c. Consequently, since the picture of the components of red, blue and green are read at each simplex pixel by using the monochromatic light sources 18a–18c sequentially, a color picture can be read at three times the pixel density as compared with the case of using the micro color filter.

Like the above-mentioned liquid crystal display device in monochrome, since the TFT(L) 26 and the TFT(D) 27 are controlled by common source line 22 and gate line 23, and the gate line exclusive to the TFT(D) 27 are not necessary, effective display area of a picture can be enlarged and high visibility can be obtained However, even if the gate line exdusive to the TFT(D) 27 are provided, the effect of raising the pixel density is obtained likewise.
(Variant Example of Embodiment 5)

An example of a liquid crystal display device with a function of reading a picture, wherein the crosstalk can be reduced since the light from adjacent pixels never enters by irradiating the light of the backlight 18 to an original at each single pixel or each set of pixels which are not adjacent to each other and reading an original picture, is described as Variant Example of the above-mentioned Embodiment 5.

This liquid crystal display device is composed similarly to Embodiment 5 and differently, chiefly, in the control operation of the control part 71 while reading a picture.

That is, while reading an original picture, picture data of the component of each color in an original picture are read by using the monochromatic light sources 18a–18c of red, blue and green sequentially and executing the same read operation as the above-mentioned liquid crystal display device in monochrome at each of the monochromatic light sources 18a–18c. For further details, first, the monochromatic light source 18a of red is used, red light is irradiated to an original through the transparent pixel electrodes 24 at each set of pixels which are not adjacent to each other, and the quantity of reflected light according to red component in the original picture is detected. Next, the monochromatic light source 18b of blue is used, and a picture of blue component is read, and additionally, the monochromatic light sources 18c of green is used, and a picture of green component is read. Thus, color picture data are read by repeating the above-mentioned read operation three times with the use of the monochromatic light sources 18a–18c. Consequently, since the picture of the components of red, blue and green are read at each simplex pixel by using the monochromatic light sources 18a–18c sequentially, a color picture can be read at three times the pixel density as compared with the case of using the micro color filter.

The crosstalk with adjacent pixels can be reduced certainly and the resolution can be raised by irradiating the light of each of the monochromatic light sources 18a–18c at each set of pixels which are not adjacent to each other and reading an original picture, even if the pixel density is high as described above.

The read by irradiating the light of red, blue and green sequentially at each set of pixels may be repeated by the number of the sets of pixels instead of executing the read at each set of pixels which are not adjacent to each other in the light of each color.

(Embodiment 6)

An example of a liquid crystal display device having a micro color filter and high pixel density in reading is described.

Figure 14:
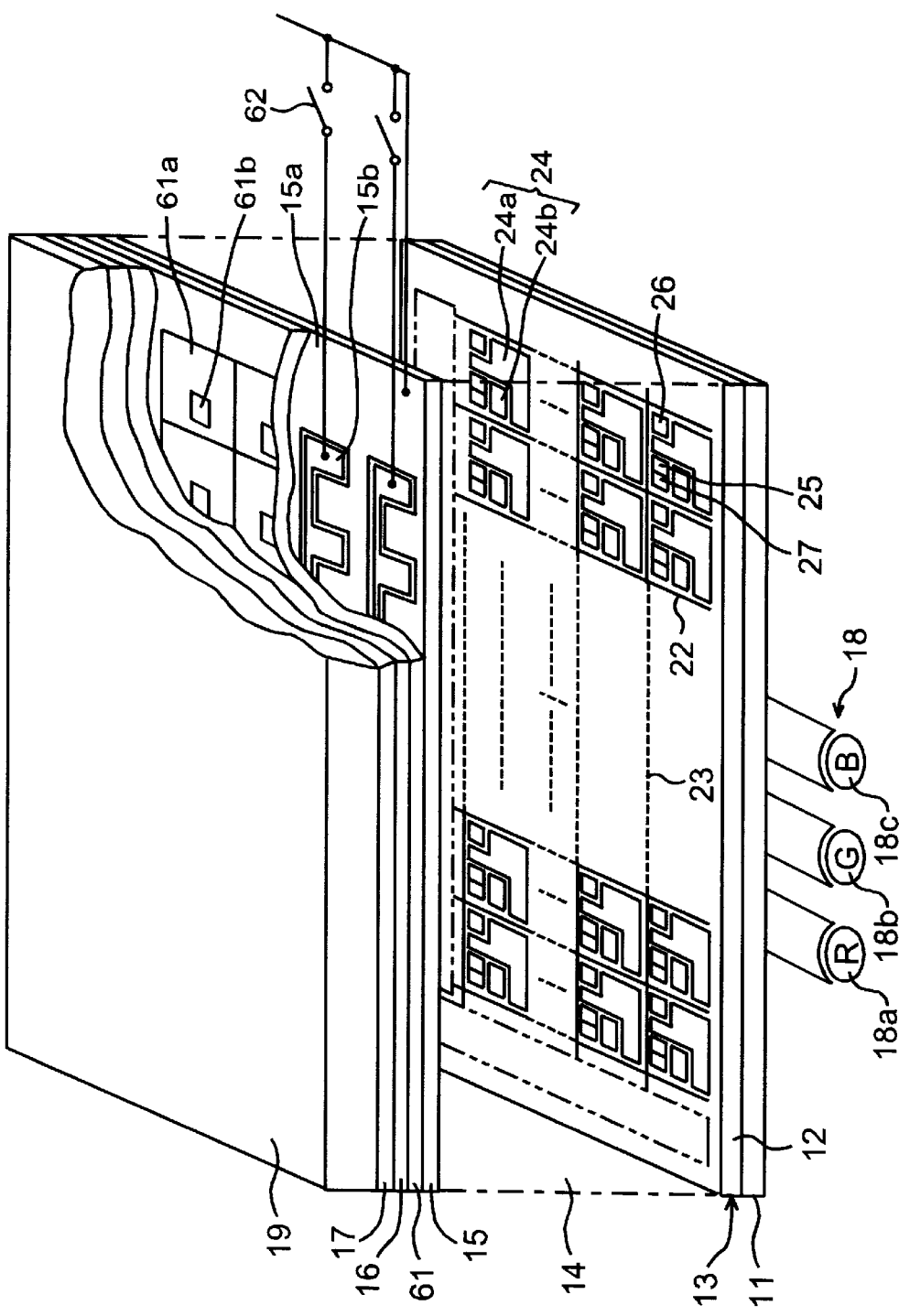
FIG. 14 is a perspective view showing an external constitution of a liquid crystal display device with a function of reading a picture in Embodiment 6.

This liquid crystal display device, as shown in FIG. 14, comprises the micro color filter 61, wherein a display field 61a for executing a display of a color picture by transmitting the light of red, green or blue corresponding to each transparent pixel electrode 24 and an illumination field 61b for illuminating an original by transmitting the light of all colors are formed, between the opposite glass substrate 16 and the transparent opposite electrode 15.

The transparent opposite electrode 15 is divided into an opposite electrode for display 15a and an opposite electrode for illumination 15b to which a field corresponding to the display field 61a or the illumination field 61b in the above-mentioned micro color filter 61 is connected respectively. The above-mentioned opposite electrode for illumination 15b is connected to the opposite electrode for display 15a or is made a high impedance state with a switch 62 controlled by a control circuit which is not shown in figures. The opposite electrode for illumination 15b need not always be connected to the opposite electrode for display 15a and may be kept at a predetermined electric potential.

Figure 15:
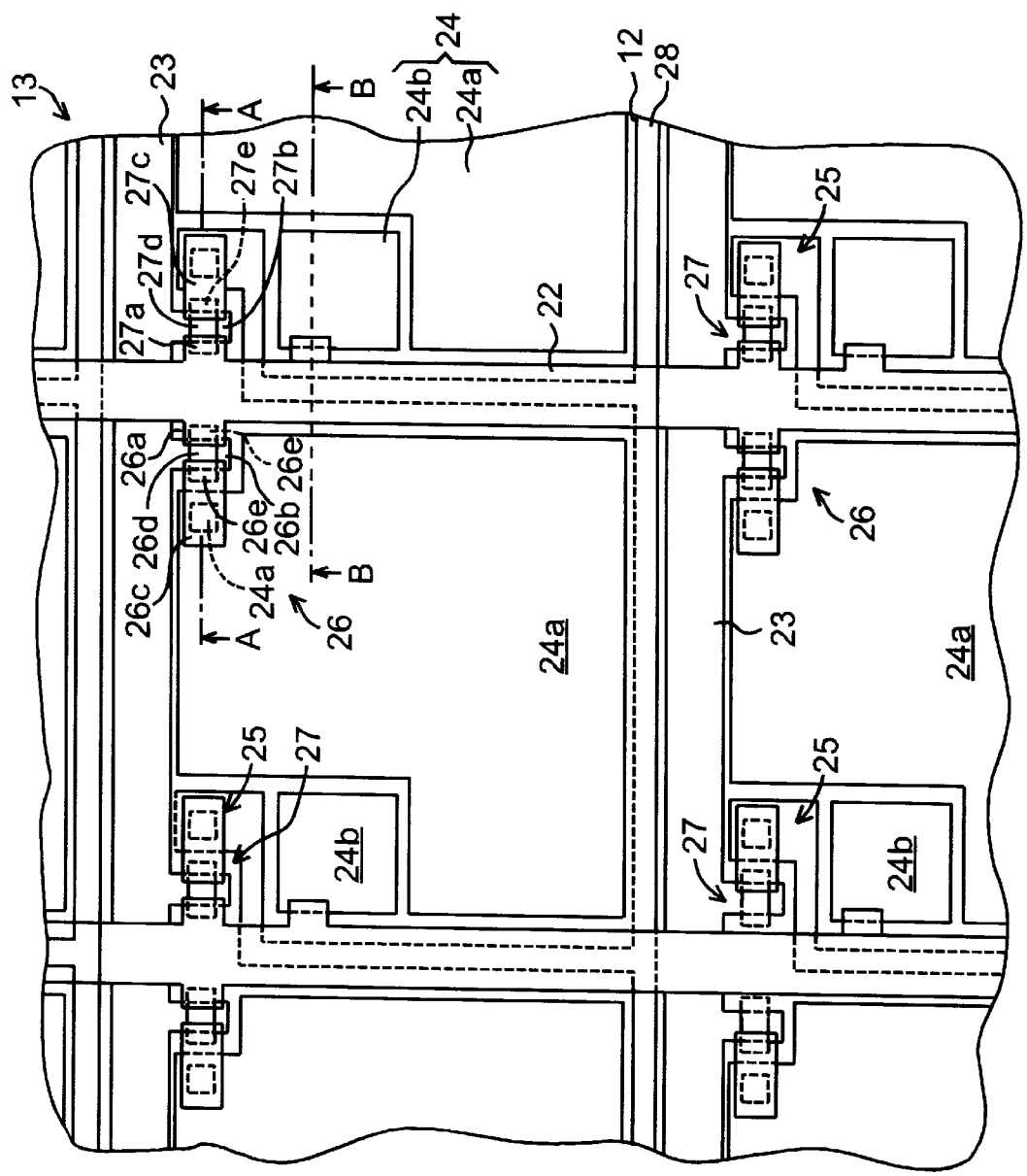
FIG. 15 is a plan view showing a concrete constitution of an active matrix panel 13 in Embodiment 6.

Meanwhile, the transparent pixel electrode 24 which is formed on the glass substrate 12, as shown in FIGS. 15 and 16, is divided into pixel electrode for display 24a connected to the TFT(L) 26 and a pixel electrode for illumination 24b connected to the source line 22, like the transparent pixel electrode 24 in the above-mentioned liquid crystal display device in monochrome.

Furthermore, the backlight 18, like the above-mentioned Embodiment 5, is composed of the monochromatic light sources 18a–18c for emitting each monochromatic light of red, blue or green.

The composition except the backlight 18 is similar to the above-mentioned liquid crystal display device in monochrome.

The operation while displaying a picture and the operation while reading a picture are described below.

(1) The Operation While Displaying a Picture

While displaying a picture, the monochromatic light sources 18a–18c of red, blue and green are turned on simultaneously and function as a white light source. The opposite electrode for illumination 15b is kept in a high impedance state by opening the switch 62, and electric charge is not stored between the opposite electrode for illumination 15b and the pixel electrode for illumination 24b regardless of electric potential at the pixel electrode for illumination 24b, namely, electric potential at the source line 22, and the light from the backlight 18 is controlled so as to be shielded at all times. In the case of composing a normally white liquid crystal display device wherein light is made a transmission state under no impression of voltage on the liquid crystal layer 14, it is preferred not to make the opposite electrode for illumination 15b the high impedance state, but to impress a predetermined voltage the absolute value of which is sufficiently high.

In this state, the display of a color picture is executed by executing the same operation as in the abovementioned Embodiment 4. That is, a color picture are displayed with an additive process of the light which is transmitted through each of the pixel electrode for display 24a, the liquid crystal layer 14 and the display field 61a in the micro color filter 61 by the same action as Embodiment 4, except that the light which enters the pixel electrode for illumination 24b at pixels is always shielded.

In this liquid crystal display device, since the pixel electrode for illumination 24b at pixels is made a shielding state, an open area ratio decreases somewhat. However, while the display in a liquid crystal display device of Embodiment 5 is executed by a time division, each simplex pixel is always made an emitting state according to picture data, therefore, a frame period can be determined at a desirable length without causing flicker.

(2) The Operation While Reading a Picture

The operation, which is different in the following respects as compared with the operation in the above-mentioned liquid crystal display device in monochrome, is executed as shown in the following Tables 4A–6A while reading a picture. However, as regards the illumination of an original, the monochromatic light sources 18a–18c of red, blue and green are used sequentially like Embodiment 5.

TABLE 4A

|  | pixel electrode charge | photodiode charge | exposure | readout |
|---|---|---|---|---|
| gate voltage Vg | VL(+) | VD(−) | (0) | VD(−) |
| TFT(L) 26 | ON | OFF | OFF | OFF |
| TFT(D) 27 | OFF | ON | OFF | ON |
| source voltage Vs | VsLmin | VsD | VsLmax | — |
| liquid crystal layer 14 | shielding | shielding | shielding | shielding |
| display field | — | — | transmission | — |
| illumination field |  |  |  |  |
| backlight 18 | arbitrary | turn off | turn on | turn off |

TABLE 4A-continued

|  | pixel electrode charge | photodiode charge | exposure | readout |
|---|---|---|---|---|
| voltage at opposite electrode for illumination | — | — | =voltage at opposite electrode for display | — |

TABLE 5A

|  | photodiode charge | pixel electrode charge | exposure | readout |
|---|---|---|---|---|
| gate voltage Vg | VD(−) | VL(+) | (0) | VD(−) |
| TFT(L) 26 | OFF | ON | OFF | OFF |
| TFT(D) 27 | ON | OFF | OFF | ON |
| source voltage Vs | VsD | VsLmin | VsLmax | — |
| liquid crystal layer 14 | — | shielding | shielding | shielding |
| display field illumination field | — | — | transmission | — |
| backlight 18 | turn off | turn off | turn on | turn off |
| voltage at opposite electrode for illumination | — | — | =voltage at opposite electrode for display | — |

TABLE 6A

|  | pixel electrode charge | photodiode charge | exposure | readout |
|---|---|---|---|---|
| gate voltage Vg | VLO < Vg | VDO < Vg < VLO | Vg < VDO | VDO < Vg < VLO |
| TFT(L) 26 | ON | OFF | OFF | OFF |
| TFT(D) 27 | (ON) | ON | OFF | ON |
| source voltage Vs | VsLmin | VsD | VsLmax | — |
| liquid crystal layer 14 | shielding | shielding | shielding | shielding |
| display field illumination field | — | — | transmission | — |
| backlight 18 | arbitrary | turn off | turn on | turn off |
| voltage at opposite electrode for illumination | — | — | =voltage at opposite electrode for display | — |

That is, in the step of storing electric charge between the transparent pixel electrode 24 and the transparent opposite electrode 15 in the above-mentioned Tables 1A–3A, the source voltage Vs=VsLmin is output to the source line 22, and the electric charge is discharged between the pixel electrode for display 24a and the opposite electrode for display 15a, and the pixel electrode for display 24a at pixels is made a shielding state. Consequently, such action that the display field 61a in the micro color filter 61 transmits only the light of red, blue or green does not affect the read of a picture.

In the step of exposing the photodiode 25 to reflected light from an original, the opposite electrode for illumination 15b is connected to the opposite electrode for display 15a through the switch 62 as well as the source voltage Vs=VsLmax corresponding to maximal luminance is impressed on the pixel electrode for illumination 24b through the source line 22, and the pixel electrode for illumination 24b at pixels is made a transmission state. Then, since the illumination field 61b in the micro color filter 61 transmits the light of all colors as described above, monochromatic light which is emitted from any monochromatic light source 18a–18c of red, blue or green is irradiated intactly to the original. Therefore, like the above-mentioned Embodiment 5, picture data of the component of each color in an original picture are read by using the monochromatic light sources 18a–18c of red, blue and green sequentially and executing the same read operation as the above-mentioned liquid crystal display device in monochrome at each of the monochromatic light sources 18a–18c.

As described above, while displaying a picture, a color picture are displayed with an additive process of three simplex pixels by using the micro color filter, and on the other hand, while reading a picture, an original picture can be read at three times as high pixel density as in displaying by reading the component of each color with the monochromatic light sources 18a–18c of red, blue and green at each simplex pixel.

(Variant Example of Embodiment 6)

An example of a liquid crystal display device with a function of reading a picture, wherein the crosstalk can be reduced since the light from adjacent pixels never enters by irradiating the light of the backlight 18 to an original at each single pixel or each set of pixels which are not adjacent to each other and reading an original picture, is described as Variant Example of the above-mentioned Embodiment 6.

This liquid crystal display device is composed similarly to Embodiment 6 and differently, chiefly, in the control operation of the control part 71 while reading a picture, and the operation as shown in the following Tables 4B–6B is executed.

TABLE 4B

|  | pixel electrode charge | photodiode charge | exposure | readout |
|---|---|---|---|---|
| gate voltage Vg | VL(+) | VD(−) | (0) | VD(−) |
| TFT(L) 26 | ON | OFF | OFF | OFF |
| TFT(D) 27 | OFF | ON | OFF | ON |
| source voltage Vs | VsLmin | VsD | pixel P1:VsLmax pixel P2:VsLmin | — |
| liquid crystal layer 14 | shielding | shielding | shielding | shielding |
| display field illumination field | — | — | pixel P1: transmission pixel P2: shielding | — |
| backlight 18 | arbitrary | turn off | turn on | turn off |
| voltage at opposite electrode for illumination | — | — | =voltage at opposite electrode for display | — |

TABLE 5B

|  | photodiode charge | pixel electrode charge | exposure | readout |
|---|---|---|---|---|
| gate voltage Vg | VD(−) | VL(+) | (0) | VD(−) |
| TFT(L) 26 | OFF | ON | OFF | OFF |
| TFT(D) 27 | ON | OFF | OFF | ON |
| source voltage Vs | VsD | VsLmin | pixel P1:VsLmax pixel P2:VsLmin | — |
| liquid crystal layer 14 | — | shielding | shielding | shielding |
| display field illumination field | — | — | pixel P1: transmission pixel P2: shielding | — |

TABLE 5B-continued

| | photodiode charge | pixel electrode charge | exposure | readout |
|---|---|---|---|---|
| backlight 18 voltage at opposite electrode for illumination | turn off — | turn off — | turn on =voltage at opposite electrode for display | turn off — |

TABLE 6B

| | pixel electrode charge | photodiode charge | exposure | readout |
|---|---|---|---|---|
| gate voltage Vg | VLO < Vg | VDO < Vg < VLO | Vg < VDO | VDO < Vg < VLO |
| TFT(L) 26 | ON | OFF | OFF | OFF |
| TFT(D) 27 | (ON) | ON | OFF | ON |
| source voltage Vs | VsLmin | VsD | pixel P1: VsLmax pixel P2: VsLmin | — |
| liquid crystal layer 14 | shielding | shielding | shielding | shielding |
| display field illumination field | — — | — — | pixel P1: transmission pixel P2: shielding | — — |
| backlight 18 voltage at opposite electrode for illumination | arbitrary — | turn off — | turn on =voltage at opposite electrode for display | turn off — |

That is, while reading a picture, the monochromatic light sources 18a–18c of red, blue and green are used sequentially like Embodiment 6. Electric charge between the pixel electrode for display 24a and the opposite electrode for display 15a is discharged by outputting the source voltage Vs=VsLmin to the source line 22, and the pixel electrode for display 24a at pixels is made a shielding state, and such action that the display field 61a in the micro color filter 61 transmits only the light of red, blue or green does not affect the read of a picture.

Meanwhile, in the step of exposing the photodiode 25 to reflected light from an original, the opposite electrode for illumination 15b is connected to the opposite electrode for display 15a through the switch 62 as well as the source voltage Vs=VsLmax corresponding to maximal luminance is impressed on the pixel electrode for illumination 24b through the source line 22, and the pixel electrode for illumination 24b at each set of pixels which are not adjacent to each other is made a transmission state. Then, since the illumination field 61b in the micro color filter 61 transmits the light of all colors as described above, monochromatic light which is emitted from any monochromatic light source 18a–18c of red, blue or green is irradiated intactly to the original. Therefore, like the above-mentioned Embodiment 6, picture data of the component of each color in an original picture are read by using the monochromatic light sources 18a–18c of red, blue and green sequentially and executing the same read operation as the above-mentioned liquid crystal display device in monochrome at each of the monochromatic light sources 18a–18c.

INDUSTRIAL APPLICABILITY

As described above, according to the present invention, since it is possible to make only a second transistor an ON state and to read an original picture, which is detected by a photo detector, with a source line and a gate line common to a first transistor which is connected to each pixel electrode without providing the source line and the gate line exclusive to the second transistor which is connected to one end of the photo detector, the downsizing of the device and the improvement of operationalization and the decrease of manufacturing cost can be intended without causing the deterioration of visibility by the decrease of effective display area of a picture.

Since it is possible to irradiate a light of a plurality of colors to an original at each pixel and detect a quantity of a reflected light by comprising a plurality of back light sources for emitting a light of a different color from each other, a color picture can be read with high pixel density.

Such effect that the crosstalk between adjacent pixels can be reduced and the resolution can be improved is taken even in the case of high pixel density in reading by making a liquid crystal a transmission state at each single pixel or each set of pixels which are not adjacent to each other and irradiating a light of a backlight to an original and reading an original picture.

Furthermore, such effect that the between adjacent pixel can be reduced and the resolution can be improved, and additionally, high reading rate is intended is taken even in the case of high pixel density in reading by making the liquid crystal the transmission state and irradiating the light of the backlight to the original and reading the original picture as well as holding electric charge at the photo detector at each single pixel or each set of pixels which are not adjacent to each other.

Accordingly, by means of applying to such display devices as personal computers, particularly, notebook type personal computers, the downsizing of the device and the improvement of operationalization can be intended without causing the deterioration of visbility, and high pixel density in reading can be obtained, and additionally, the decrease of manufacturing cost and electric power consumption can be intended.

What is claimed is:

1. A liquid crystal display device with a function of reading a picture comprising:
   a plurality of source lines for transferring a picture signal;
   a plurality of gate lines for transferring a scanning signal which are provided in a crossing direction with said source lines;
   a pixel electrode which is provided corresponding to each crossing section of the source lines and the gate lines;
   a first transistor which is connected to the source lines and the gate lines as well as each of the pixel electrodes;
   an opposite electrode which is provided opposite to the pixel electrode;
   a liquid crystal which is provided between the pixel electrode and the opposite electrode; and
   a photo detector for detecting a quantity of a reflected light from an original which is provided corresponding to each of the pixel electrodes;
   fiber comprising:
   a second transistor which is connected to said source lines and said gate lines as well as one end of the photo detector; and
   the other end line which is connected to the other end of the photo detector;
   said liquid crystal display device with a function of reading a picture wherein:

a threshold value of a gate voltage in said first transistor and a threshold value of a gate voltage in said second transistor are determined so that at least only the second transistor can be made an ON state.

2. A liquid crystal display device with a function of reading a picture according to claim 1, wherein:
the threshold value of the gate voltage in said first transistor and the threshold value of the gate voltage in said second transistor are determined so that only the first transistor also can be made an ON state.

3. A liquid crystal display device with a function of reading a picture according to claim 2, wherein:
said first transistor and said second transistor are transistors with a reversed polarity of n-channel or p-channel to each other.

4. A liquid crystal display device with a function of reading a picture according to claim 3, wherein:
said first transistor is a transistor with n-channel while said second transistor is a transistor with p-channel.

5. A liquid crystal display device with a function of reading a picture according to claim 1, wherein:
said photo detector detects the quantity of the reflected light from the original by a discharge of an electric charge held beforehand due to the reflected light from the original;
the threshold value of the gate voltage in said first transistor and the threshold value of the gate voltage in said second transistor are determined so that both the first transistor and the second transistor can be made an ON state simultaneously as well; and
said liquid crystal is made a transmission state under an action of an electric field.

6. A liquid crystal display device with a function of reading a picture according to claim 5, wherein:
said first transistor and said second transistor are transistors with the same polarity of n-channel or p-channel as each other; and
a threshold absolute value of the gate voltage in the second transistor is determined lower than that of the gate voltage in the first transistor.

7. A liquid crystal display device with a function of reading a picture according to claim 5, wherein:
a dielectric constant anisotropy of said liquid crystal is negative; and
a pair of polarizers with a different polarized direction from each other are provided on both sides of said liquid crystal.

8. A liquid crystal display device with a function of reading a picture according to claim 5, wherein:
a dielectric constant anisotropy of said liquid crystal is positive; and
a pair of polarizers with the same polarized direction as each other are provided on both sides of said liquid crystal.

9. A liquid crystal display device with a function of reading a picture according to claim 5, comprising:
a photodiode as said photo detector;
wherein:
said photodiode is connected so that a reverse bias voltage can be impressed from the source line through the second transistor in displaying the picture.

10. A liquid crystal display device with a function of reading a picture according to claim 5, wherein:
a voltage which is equal to the source line is impressed on the other end line which is connected to the other end of said photo detector in displaying the picture.

11. A liquid crystal display device with a function of reading a picture according to claim 1, wherein:
a light shielding electrode which is formed on the same substrate as said photo detector is the other end line which is connected to the other end of the photo detector.

12. A liquid crystal display device with a function of reading a picture according to claim 1, comprising:
such in-plane switching system that the pixel electrode and the opposite electrode are formed on the same substrate;
wherein:
said opposite electrode is the other end line which is connected to the other end of the photo detector.

13. A liquid crystal display device with a function of reading a picture according to claim 1, wherein:
a touch sensor for detecting a setting state of the original is further provided on a surface side of the liquid crystal.

14. A liquid crystal display device with a function of reading a picture according to claim 1, further comprising:
a color filter in which a field for transmitting a light of each predetermined color is formed corresponding to said pixel electrode;
wherein:
in displaying the picture, a color picture is displayed with an additive process of a light which is transmitted through the field of each color in said color filter; and
in reading the picture, the color picture is read by irradiating a light to the original through the field of each color in said color filter and detecting the quantity of the reflected light.

15. A liquid crystal display device with a function of reading a picture according to claim 1, further comprising:
a plurality of back light sources for emitting a light of a different color from each other;
wherein:
in displaying the picture, a color picture is displayed by lighting each of said back light sources selectively in sequence and displaying the picture of each color in a time division; and
in reading the picture, the color picture is read by lighting each of said back light sources selectively in sequence and irradiating a light of each color to the original and detecting the quantity of the reflected light of each color from the original.

16. A liquid crystal display device with a function of reading a picture according to claim 1, further comprising:
a color filter in which a display field for transmitting a light of each predetermined color and an illumination field for transmitting a light of all colors are formed corresponding to each pixel; and
a plurality of back light sources for emitting a light of a different color from each other and a light of a white color when they are lit simultaneously;
wherein:
in displaying the picture, a color picture is displayed with an additive process of a light which is transmitted through the display field of each color in said color filter by lighting all of said back light sources as well as making the liquid crystal corresponding to the illumination field in said color filter a shielding state and meanwhile making the liquid crystal corresponding to the display field a transmission state according to the picture signal; and in reading an original picture, the color picture is read by lighting each of said back light sources selectively in sequence and irradiating a light of each color to the original through the illumination field in said color filter and detecting the quantity of the reflected light of each color from the original as well as making the liquid crystal corresponding to the display field in said color filter the shielding state and meanwhile making the liquid crystal corresponding to the illumination field the transmission state.

17. A method of reading a picture by using a liquid crystal display device with a function of reading a picture comprising:

a plurality of source lines for transferring a picture signal;

a plurality of gate lines for transferring a scanning signal which are provided in a crossing direction with said source lines;

a pixel electrode which is provided corresponding to each crossing section of the source lines and the gate lines;

a first transistor which is connected to the source lines and the gate lines as well as each of the pixel electrodes;

an opposite electrode which is provided opposite to the pixel electrode;

a liquid crystal which is provided between the pixel electrode and the opposite electrode;

a photo detector which is provided corresponding to each of the pixel electrodes for detecting a quantity of a reflected light from an original by a discharge of an electric charge held beforehand due to the reflected light from the original;

a second transistor which is connected to said source lines and said gate lines as well as one end of the photo detector, and the other end line which is connected to the other end of the photo detector;

said liquid crystal display device with a function of reading a picture wherein:

a threshold value of a gate voltage in said first transistor and a threshold value of a gate voltage in said second transistor are determined so that at least only the second transistor can be made an ON state;

said method comprising the steps of:

impressing a first predetermined voltage on the source line and making the liquid crystal a transmission state by making at least the first transistor the ON state;

impressing a second predetermined voltage on the source line and holding a predetermined electric charge at the photo detector by making at least the second transistor the ON state;

exposing the photo detector to the reflected light from the original; and detecting a light exposure of the photo detector through the source line by making only the second transistor the ON state after exposing said photo detector.

18. A method of reading a picture by using a liquid crystal display device with a function of reading a picture comprising:

a plurality of source lines for transferring a picture signal;

a plurality of gate lines for transferring a scanning signal which are provided in a crossing direction with said source lines;

a pixel electrode which is provided corresponding to each crossing section of the source lines and the gate lines;

a first transistor which is connected to the source lines and the gate lines as well as each of the pixel electrodes;

an opposite electrode which is provided opposite to the pixel electrode;

a liquid crystal which is provided between the pixel electrode and the opposite electrode;

a photo detector which is provided corresponding to each of the pixel electrodes for detecting a quantity of a reflected light from an original by a discharge of an electric charge held beforehand due to the reflected light from the original;

a second transistor which is connected to said source lines and said gate lines as well as one end of the photo detector; and the other end line which is connected to the other end of the photo detector;

said liquid crystal display device with a function of reading a picture wherein:

a threshold value of a gate voltage in said first transistor and a threshold value of a gate voltage in said second transistor are determined so that at least only the second transistor can be made an ON state;

the threshold value of the gate voltage in said first transistor and the threshold value of the gate voltage in said second transistor are determined so that both the first transistor and the second transistor can be made the ON state simultaneously as well; and said liquid crystal is made a transon state under an action of an electric field;

said method wherein:

said first voltage and said second voltage are equal to each other; and the step of making the liquid crystal the transmission state and the step of holding a predetermined electric charge at the photo detector are executed simultaneously.

19. A method of manufacturing a liquid crystal display device with a function of reading a picture comprising:

a plurality of source lines for transferring a picture signal;

a plurality of gate lines for transferring a scanning signal which are provided in a crossing direction with said source lines;

a pixel electrode which is provided corresponding to each crossing section of the source lines and the gate lines;

a first transistor which is connected to the source lines and the gate lines as well as each of the pixel electrodes;

an opposite electrode which is provided opposite to the pixel electrode;

a liquid crystal which is provided between the pixel electrode and the opposite electrode;

a photo detector for detecting a quantity of a reflected light from an original which is provided corresponding to each of the pixel electrodes;

a second transistor which is connected to said source lines and said gate lines as well as one end of the photo detector; and the other end line which is connected to the other end of the photo detector;

said liquid crystal display device with a function of reading a picture wherein:

a threshold value of a gate voltage in said first transistor and a threhold value of a gate voltage in said second transistor are determined so that at least only the second transistor can be made an ON state;

said method wherein:

the other end line which is connected to the other end of said photo detector is formed in a process of forming a gate electrode of at least one of the first transistor and the second transistor.

20. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors for detecting a quantity of a reflected light from an original picture, each of said photo detectors provided corresponding to each of the pixel electrodes; and a plurality of back light sources, each emitting a monochromatic light of one of the colors selected from red, green, and blue;

wherein, when displaying a picture, each of said plurality of back light sources is selectively lit to emit said monochromatic light in sequence so that a picture of each of the colors is displayed in time division, whereby a multi-color picture is produced; and wherein, when reading a picture, each of said plurality of back light sources is selectively lit so that an original picture is irradiated with one of said monochromatic lights in sequence, and a quantity of each monochromatic light reflected from said original picture is detected by each of said photo detectors, whereby a multi-color picture is read.

21. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors for detecting a quantity of a reflected light from an original picture, each of said photo detectors provided corresponding to each of the pixel electrodes;

a color filter having a display field transmitting a light of a predetermined color and an illumination field transmitting a light of any color, said display field and said illumination field being provided corresponding to each pixel; and a plurality of back light sources, each emitting a monochromatic light of one of the colors selected from red, green, and blue, and emitting a light of white color when said back light sources are lit simultaneously;

wherein, when displaying a picture, a liquid crystal in a portion corresponding to said illumination field of said color filter blocks light while a liquid crystal in a portion corresponding to said display field transmits light in response to a picture signal, and all of said back light sources are lit to yield additive color mixture of the colors of the lights being transmitted through said display field of said color filter, whereby a multi-color picture is produced; and wherein, when reading a picture, said liquid crystal in a portion corresponding to said display field of said color filter blocks light while said liquid crystal in a portion corresponding to said illumination field transmits light, each of said back light sources is selectively lit so that an original picture is irradiated in sequence with one of said monochromatic lights through said illumination field of said color filter, and a quantity of each monochromatic light reflected from said original picture is detected by each of said photo detectors, whereby a multi-color picture is read.

22. A liquid crystal display device with a function of reading a picture comprising:

a plurality of first pixel electrodes;

an opposite electrode opposed to the plurality of first pixel electrodes;

a liquid crystal provided between the plurality of first pixel electrodes and the opposite electrode;

a plurality of photo detectors for detecting a quantity of a reflected light from an original picture, each of said photo detectors provided corresponding to each of said first pixel electrodes;

a plurality of second pixel electrodes for illumination provided corresponding to each of said first pixel electrodes;

a second opposite electrode for illumination opposed to said second pixel electrodes;

a color filter having a display field transmitting a light of a predetermined color and an illumination field transmitting a light of any color, said display field being provided corresponding to each of said plurality of pixel electrodes and said illumination field being provided corresponding to each of said second pixel electrodes for illumination; and a plurality of back light sources, each emitting a monochromatic light of one of the colors selected from red, green, and blue, and emitting a light of white color when said back light sources are lit simultaneously;

wherein, when displaying a picture, a voltage between said plurality of second pixel electrodes for illumination and said second opposite electrode for illumination is set at a predetermined voltage such that a light entering said second pixel electrodes is blocked, and all of said back light sources are lit to yield additive color mixture of the colors of the lights being transmitted through said display field of said color filter, whereby a multi-color picture is produced; and wherein, when reading a picture, a voltage between said plurality of pixel electrodes and said opposite electrode is set at a predetermined voltage such that a light entering said pixel electrodes is blocked, while said voltage between said plurality of second pixel electrodes for illumination and said opposite electrode for illumination is set at a predetermined voltage such that a light entering said second pixel electrodes is transmitted, and each of said back light sources is selectively lit so that an original picture is irradiated in sequence with said monochromatic light of one of said colors through said second pixel electrodes and said illumination field of said color filter, and a quantity of each monochromatic light reflected from said original picture is detected by each of said photo detectors, whereby a multi-color picture is read.

23. A liquid crystal display device with a function of reading a picture according to claim 22, further comprising:

a plurality of source lines for transmitting a picture signal;

a plurality of gate lines for transmitting a scanning signal, said gate lines provided in a crossing direction with said source lines;

a plurality of transistors, each connected to each of said pixel electrodes and one of said source lines and one of said sate lines, said plurality of transistors for connecting and disconnecting said source lines and said pixel electrodes in response to the scanning signal provided from said gate lines; and a switching means connecting and disconnecting said opposite electrode and said second opposite electrode for illumination;

wherein each of said second pixel electrodes for illumination are connected to one of said source lines; and wherein said liquid crystal transmits light when a predetermined voltage is applied thereto.

24. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors for detecting a quantity of a reflected light from an original picture, each of said photo detectors provided corresponding to each of the pixel electrodes and a plurality of back light sources, each emitting a monochromatic light of one of the colors selected from red, green, and blue, said method comprising the steps of:

displaying a color picture wherein each of said plurality of back light sources is selectively lit to emit said monochromatic light in sequence so that a picture of each of the colors is displayed in time division, whereby a multi-color picture is produced; and reading a color picture wherein each of said plurality of back light sources is selectively lit so that an original picture is irradiated with one of said monochromatic lights in sequence, and a quantity of each monochromatic light reflected from said original picture is detected by each of said photo detectors, whereby a multi-color picture is read.

25. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors for detecting a quantity of a reflected light from an original picture, each of said photo detectors provided corresponding to each of the pixel electrodes, a color filter having a display field transmitting a light of a predetermined color and an illumination field transmitting a light of any color, said display field and said illumination field being provided corresponding to each pixel, and a plurality of back light sources, each emitting a monochromatic light of one of the colors selected from red, green, and blue, and emitting a light of white color when said back light sources are lit simultaneously, said method comprising the steps of:

displaying a color picture wherein a liquid crystal in a portion corresponding to said illumination field of said color filter blocks light while a liquid crystal in a portion corresponding to said display field transmits light in response to a picture signal, and all of said back light sources are lit to yield additive color mixture of the colors of the lights being transmitted through said display field of said color filter, whereby a multi-color picture is produced; and reading a color picture wherein said liquid crystal in a portion corresponding to said display field of said color filter blocks light while said liquid crystal in a portion corresponding to said illumination field transmits light, each of said back light sources is selectively lit so that an original picture is irradiated in sequence with one of said monochromatic lights through said illumination field of said color filter, and a quantity of each monochromatic light reflected from said original picture is detected by each of said photo detectors, whereby a multi-color picture is read.

26. A method of displaying and reading a picture by using a liquid crystal display device with a function of reading a picture, said liquid crystal display device comprising a plurality of first pixel electrodes, an opposite electrode opposed to the plurality of first pixel electrodes, a liquid crystal provided between the plurality of first pixel electrodes and the opposite electrode, a plurality of photo detectors for detecting a quantity of a reflected light from an original picture, each of said photo detectors provided corresponding to each of said first pixel electrodes, a plurality of second pixel electrodes for illumination provided corresponding to each of said first pixel electrodes, a second opposite electrode for illumination opposed to said second pixel electrodes for illumination, a color filter having display field transmitting a light of a predetermine color and an illumination field transmitting a light of any color, said display field being provided corresponding to each of said plurality of pixel electrodes and said illumination field being provided corresponding to each of said second pixel electrodes for illumination, and a plurality of back light sources, each emitting a monochromatic light of one of the colors selected from red, green, and blue, and emitting a light of white color when said back light sources are lit simultaneously, said method comprising the steps of:

displaying a color picture wherein a voltage between said plurality of second pixel electrodes for illumination and said second opposite electrode for illumination is set a predetermined voltage such that a light entering said second pixel electrodes is blocked, and all of said back light sources are lit to yield additive color mixture of the colors of the lights being transmitted through said display field of said color filter, whereby a multi-color picture is produced; and reading a color picture wherein a voltage between said plurality of pixel electrodes and said opposite electrode is set at a predetermined voltage such that a light entering said pixel electrodes is blocked, while said voltage between said plurality of second pixel electrodes for illumination and said opposite electrode for illumination is set at a predetermined voltage such that a light entering said second pixel electrodes is transmitted, and each of said back light sources is selectively lit so that an original picture is irradiated in sequence with said monochromatic light of one of said colors through said second pixel electrodes and said illumination field of said color filter, and a quantity of each monochromatic light reflected from said original picture is detected by each of said photo detectors, whereby a multi-color picture is read.

27. A liquid crystal display device with function of reading a picture comprising:

a plurality of source lines for transmitting a picture signal;

a plurality of gate lines for transmitting a scanning signal, said gate lines provided in a crossing direction with said source lines;

a plurality of pixel electrodes provided corresponding to each intersection of the source lines and the gate lines;

a plurality of first transistors, each connected to one of the source lines and one of the gate lines and each of the pixel electrodes;

an opposite electrode opposed to the pixel electrodes;

a liquid crystal provided between the plurality of pixel electrodes and the opposite electrode;

a plurality of photo detectors for detecting a quantity of a reflected light from an original picture, each of said photo detectors provided corresponding to each of the pixel electrodes;

a plurality of second transistors, each connected to one of said source lines an one of said gate lines and one end of each of the photo detectors;

an other end line connected to the other end of each of the photo detectors; and a back light source emitting a light for displaying a picture and a light for illuminating the original picture;

wherein, when reading a picture, said liquid crystal is made to transmit light in a single pixel at a time or in a set of pixels not adjacent to each other at a time so that the light from said back light source irradiates the original picture, and a quantity of the reflected light from the original picture is detected by said photo detectors, whereby the original picture is read.

28. A liquid crystal display device with a function of reading a picture according to claim 27, wherein said set of pixels not adjacent to each other is composed of a plurality of pixels, each disposed between every two or more pixels.

29. A liquid crystal display device with a function of reading a picture according to claim 27, wherein said set of pixels not adjacent to each other is composed of a plurality of pixels disposed next to each other along a predetermined direction and each disposed between every two or more pixels along a direction perpendicular to said predetermined direction.

30. A liquid crystal display device with a function of reading a picture according to claim 27, further comprising:

a color filter having a plurality of fields, each transmitting a light of a predetermined color, said plurality of fields provided corresponding to each of said pixel electrodes;

wherein, when displaying a picture, a light transmits through said plurality of fields in said color filter to yield additive color mixture, whereby a multi-color picture is produced; and when reading a picture, a light transmits through said plurality of fields in said color filter so as to irradiate the original picture and is reflected by the original picture, and the quantity of the reflected light is detected, whereby a multi-color picture is read.

31. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors for detecting a quantity of a reflected light from an original picture, each of said photo detectors provided corresponding to each of the pixel electrodes; and a plurality of back light sources, each emitting a monochromatic light of one of the colors selected from red, green, and blue;

wherein, when displaying a picture, each of said plurality of back light sources is selectively lit to emit said monochromatic light in sequence so that a picture of each of the colors is displayed in time division, whereby a multi-color picture is produced; and wherein, when reading a picture, each of said plurality of back light sources is selectively lit so that an original picture is irradiated with one of said monochromatic lights in sequence through a single pixel at a time or through a set of pixels not adjacent to each other at a time, and a quantity of each monochromatic light reflected from said original picture is detected by each of said photo detectors, whereby a multi-color picture is read.

32. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors for detecting a quantity of a reflected light from an original picture, each of said photo detectors provided corresponding to each of the pixel electrodes;

a color filter having a display field transmitting a light of a predetermined color and an illumination field transmitting a light of any color, said display field and said illumination field being provided corresponding to each pixel; and a plurality of back light sources, each emitting a monochromatic light of one of the colors selected from red, green, and blue, and emitting a light of white color when said back light sources are lit simultaneously;

wherein when displaying a picture, a liquid crystal in a portion corresponding to said illumination field blocks light while a liquid crystal in a portion corresponding to the display field transmits light in response to a picture signal, and all of said back light sources are lit to yield additive color mixture of the colors of the lights being transmitted through said display field of said color filter, whereby a multi-color picture is produced; and wherein, when reading an original picture, said liquid crystal in a portion corresponding to said display field in said color filter blocks light in all the pixels while said liquid crystal in a portion corresponding to said illumination field transmits light through a single pixel at a time or through a set of pixels not adjacent to each other at a time, each of said back light sources is selectively lit so that the original picture is irradiated with one of said monochromatic lights in sequence through said illumination field in said color filter, and a quantity of each monochromatic light reflected from said original picture is detected by each of said photo detectors, whereby a multi-color picture is read.

33. A method of displaying and reading a picture by using a liquid crystal display device with a function of reading a picture, said liquid crystal display device comprising a plurality of source lines for transmitting a picture signal, a plurality of gate lines for transmitting a scanning signal, said gate lines provided in a crossing direction with said source lines, a plurality of pixel electrodes provided corresponding to each intersection of the source lines and the gate lines, a plurality of first transistors, each connected to one of the source lines and one of the gate lines and each of the pixel electrodes, an opposite electrode opposed to the pixel electrodes, a liquid crystal provided between the plurality of pixel electrodes and the opposite electrode, a plurality of photo detectors for detecting a quantity of a reflected light from an original picture, each of said photo detectors provided corresponding to each of the pixel electrodes, a plurality of second transistors, each connected to one of said source lines and one of said gate lines and one end of each of the photo detectors, an other end line connected to the other end of each of the photo detectors; and a back light source emitting a light for displaying a picture and a light for illuminating the original picture, said method comprising:

repeating a plurality of times the step of reading the original picture wherein said liquid crystal is made to transmit light in a single pixel at a time or in a set of pixels not adjacent to each other at a time so that the light from said back light source irradiates the original picture, and a quantity of the reflected light from the original picture is detected by said photo detectors, whereby the original picture is read.

34. A method of displaying and reading a picture according to claim 33, wherein said set of pixels not adjacent to each other is composed of a plurality of pixels, each disposed between every two or more pixels.

35. A method of displaying and reading a picture according to claim 33, wherein said set of pixels not adjacent to each other is composed of a plurality of pixels disposed next to each other along a predetermined direction and each disposed between every two or more pixels along a direction perpendicular to said predetermined direction.

36. A method of displaying and reading a picture according to claim 33, wherein:

said liquid crystal display device further comprises a color filter having a plurality of fields, each transmitting a light of a predetermined color, said plurality of fields provided corresponding to each of said pixel electrodes;

said step of displaying comprises a step such that a light transmits through said plurality of fields in said color filter to yield an additive color mixture, whereby a multi-color picture is produced; and said step of reading is such that a light transmits through said plurality of fields in said color filter to irradiate the original picture and is reflected by the original picture, and a quantity of the reflected light is detected, whereby a multi-color picture is read.

37. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors for detecting a quantity of a reflected light from an original picture, each of said photo detectors provided corresponding to each of the pixel electrodes, and a plurality of back light sources, each emitting a monochromatic light of one of the colors selected from red, green, and blue, said method comprising the steps of:

displaying a color picture wherein each of said plurality of back light sources is selectively lit to emit said monochromatic light in sequence so that a picture of each of the colors is displayed in time division, whereby a multi-color picture is produced; and reading a color picture wherein each of said plurality of back light sources is selectively lit so that an original picture is irradiated with one of said monochromatic lights in sequence through a single pixel at a time or a set of pixels not adjacent to each other at a time, and a quantity of each monochromatic light reflected from said original picture is detected by each of said photo detectors, whereby a multi-color picture is read.

38. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors for detecting a quantity of a reflected light from an original picture, each of said photo detectors provided corresponding to each of the pixel electrodes, a color filter having a display field transmitting a light of a predetermined color and an illumination field transmitting a light of any color, said display field an d said illumnation field being provided corresponding to each pixel, and a plurality of back light sources, each emitting a monochromatic light of one of the colors selected from red, green, and blue, and emitting a light of white color when said back light sources are lit simultaneously, said method comprising the steps of:

displaying a color picture wherein a liquid crystal in a portion corresponding to said illumination field blocks light while a liquid crystal in a portion corresponding to the display field transmits light in response to a picture signal, and all of said back light sources are lit to yield additive color mixture of the colors of the lights being transmitted through said display field of said color filter, whereby a multi-color picture is produced; and reading a color picture wherein said liquid crystal in a portion corresponding to said display field of said color filter blocks light in all the pixels while said liquid crystal in a portion corresponding to said illumination field transmits light in a single pixel or a set of pixels not adjacent to each other, each of said back light sources is selectively lit so that an original picture is irradiated in sequence with one of said monochromatic lights through said illumination field of said color filter, and a quantity of each monochromatic light reflected from said original picture is detected by each of said photo detectors, whereby a multi-color picture is read.

39. A liquid crystal display device with a function of reading a picture comprising:

a plurality of source lines for transmitting a picture signal;

a plurality of gate lines for transmitting a scanning signal, said gate lines provided in a crossing direction with said source lines;

a plurality of pixel electrodes provided corresponding to each intersection of the source lines and the gate lines;

a plurality of first transistors, each connected to one of the source lines and one of the gate lines and each of the pixel electrodes;

an opposite electrode opposed to the pixel electrodes;

a liquid crystal provided between the plurality of pixel electrodes and the opposite electrode;

a plurality of photo detectors, each provided corresponding to each of the pixel electrodes, said photo detectors being ones in which an electric charge retained therein beforehand is discharged by receiving a reflected light from an original picture and thereby a quantity of the reflected light is detected;

a plurality of second transistors, each connected to one of said source lines and one of said gate lines and one end of each of the photo detectors;

an other end line connected to the other end of each of the photo detectors; and a back light source emitting a light for displaying a picture and a light for illuminating the original picture;

wherein, when reading a picture, said-photo detectors are made to retain an electric charge for a single pixel at a time or for a set of pixels not adjacent to each other at a time, and said liquid crystal is made to transmit light through a single pixel at a time or through a set of pixels not adjacent to each other at a time so that the light from said back light source irradiates the original picture, and a quantity of the reflected light is detected by said photo detectors, whereby the original picture is read.

40. A liquid crystal display device with a function of reading a picture according to claim 39, wherein said set of pixels not adjacent to each other is composed of a plurality of pixels, each disposed between every two or more pixels.

41. A liquid crystal display device with a function of reading a picture according to claim 39, wherein said set of pixels not adjacent to each other is composed of a plurality of pixels disposed next to each other along a predetermined direction and each disposed between every two or more pixels along a direction perpendicular to said predetermined direction.

42. A liquid crystal display device with a function of reading a picture according to claim 39, further comprising:

a color filter having a plurality of fields, each transmitting a light of a predetermined color, said plurality of fields provided corresponding to each of said pixel electrodes;

wherein, when displaying a picture, a light transmits through said plurality of fields in said color filter to yield an additive color mixture, whereby a multi-color picture is produced; and wherein, when reading a picture, a light transmits through said plurality of fields in said color filter to irradiate the original picture and is reflected by the original picture, and the quantity of the reflected light is detected, whereby a multi-color picture is read.

43. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors, each provided corresponding to each of the pixel electrodes, said photo detectors being ones in which an electric charge retained therein beforehand is discharged by receiving a reflected light from an original picture and thereby a quantity of the reflected light is detected; and a plurality of back light sources, each emitting a monochromatic light of one of the colors selected from red, green, and blue;

wherein, when displaying a picture, each of said plurality of back light sources is selectively lit to emit said monochromatic light in sequence so that a picture of each of the colors is displayed in time division, whereby a multi-color picture is produced; and wherein, when reading a picture, said photo detectors are made to retain an electric charge for a single pixel at a time or for a set of pixels not adjacent to each other at a time, each of said plurality of back light sources is selectively lit so that an original picture is irradiated with one of said monochromatic lights in sequence through a single pixel at a time or through a set of pixels not adjacent to each other at a time, and a quantity of the reflected light is detected by each of said photo detectors, whereby the original picture is read.

44. A liquid crystal display device with a function of reading a picture comprising:

a plurality of pixel electrodes;

an opposite electrode opposed to the plurality of pixel electrodes;

a liquid crystal provided between the plurality of pixel electrodes and the opposite electrode;

a plurality of photo detectors, each provided corresponding to each of the pixel electrodes, said photo detectors being ones in which an electric charge retained therein beforehand is discharged by receiving a reflected light from an original picture and thereby a quantity of the reflected light is detected;

a color filter having a display field transmitting a light of a predetermined color and an illumination field transmitting a light of any color, said display field and said illumination field being provided corresponding to each pixel; and a plurality of back light sources, each emitting a monochromatic light of one of the colors selected from red, green, and blue, and emitting a light of white color when said back light sources are lit simultaneously;

wherein, when displaying a picture, a liquid crystal in a portion corresponding to said illumination field of said color filter blocks light while a liquid crystal in a portion corresponding to said display field transmits light in response to a picture signal, and all of said back light sources are lit to yield additive color mixture of the colors of the lights being transmitted through said display field of said color filter, whereby a multi-color picture is produced; and wherein, when reading an original picture, (a) said liquid crystal in a portion corresponding to said display field in said color filter blocks light in all the pixels while said liquid crystal in a portion corresponding to said illumination field transmits light through a single pixel at a time or through a set of pixels not adjacent to each other at a time, (b) said photo detectors are made to retain an electric charge for a single pixel at a time or for a set of pixels not adjacent to each other at a time, (c) each of said back light sources is selectively lit so that the original picture is irradiated with one of said monochromatic lights in sequence through said illumination field in said color filter, and (d) a quantity of each monochromatic light reflected from said original picture is detected by each of said photo detectors, whereby a multi-color picture is read.

45. A method of displaying and reading a picture by using a liquid crystal display device with a function of reading a picture, said liquid crystal display device comprising a plurality of source lines for transmitting a picture signal, a plurality of gate lines for transmitting a scanning signal, said gate lines provided in a crossing direction with said source lines, a plurality of pixel electrodes provided corresponding to each intersection of the source lines and the gate lines, a plurality of first transistors, each connected to one of the source lines and one of the gate lines and each of the pixel electrodes, an opposite electrode opposed to the pixel electrodes, a liquid crystal provided between the plurality of pixel electrodes and the opposite electrode, a plurality of photo detectors, each provided corresponding to each of the pixel electrodes, said photo detectors being ones in which an electric charge retained therein beforehand is discharged by receiving a reflected light from an original picture and thereby a quantity of the reflected light is detected, a plurality of second transistors, each connected to one of said source lines and one of said gate lines and one end of each of the photo detectors, an other end line connected to the other end of each of the photo detectors, and a back light source emitting a light for displaying a picture and a light for illuminating the original picture, said method comprising:

repeating a plurality of times the step of reading the original picture wherein said photo detectors are made to retain an electric charge for a single pixel at a time or for a set of pixels not adjacent to each other at a time, and said liquid crystal is made to transmit light through a single pixel at a time or through a set of pixels not adjacent to each other at a time so that the light from said back light source irradiates the original picture, and a quantity of the reflected light is detected by said photo detectors, whereby the original picture is read.

46. A method of displaying and reading a picture according to claim 45, wherein said set of pixels not adjacent to each other is composed of a plurality of pixels, each disposed between every two or more pixels.

47. A method of displaying and reading a picture according to claim 45, wherein said set of pixels not adjacent to each other is composed of a plurality of pixels disposed next to each other along a predetermined direction and each disposed between every two or more pixels along a direction perpendicular to said predetermined direction.

48. A method of displaying and reading a picture according to claim 45, wherein:

said liquid crystal display device further comprises a color filter having a plurality of fields, each transmitting a light of a predetermined color, said plurality of fields provided corresponding to each of said pixel electrodes;

said step of displaying comprises a step such that a light transmits through said plurality of fields in said color filter to yield an additive color mixture, whereby a multi-color picture is produced; and said step of reading is such that a light transmits through said plurality of fields in said color filter to irradiate the original picture and is reflected by the original picture, and a quantity of the reflected light is detected, whereby a multi-color picture is read.

49. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors, each provided corresponding to each of the pixel electrodes, said photo detectors in which an electric charge retained therein beforehand is discharged by receiving a reflected light from an original picture and thereby a quantity of the reflected light is detected, and a plurality of back light sources, each emitting a monochromatic light of one of the colors selected from red, green, and blue, said method comprising the steps of:

displaying a color picture wherein each of said plurality of back light sources is selectively lit to emit said monochromatic light in sequence so that a picture of each of the colors is displayed in time division, whereby a multi-color picture is produced; and reading a color picture wherein said photo detectors are made to retain an electric charge for a single pixel at a time or for a set of pixels not adjacent to each other at a time, each of said plurality of back light sources is selectively lit so that an original picture is irradiated with one of said monochromatic lights in sequence through a single pixel at a time or through a set of pixels not adjacent to each other at a time, and a quantity of the reflected light is detected by each of said photo detectors, whereby the original picture is read.

50. A method of displaying and reading a picture by using a liquid crystal display device with a function of reading a picture, said liquid crystal display device comprising a plurality of pixel electrodes, an opposite electrode opposed to the plurality of pixel electrodes, a liquid crystal provided between the plurality of pixel electrodes and the opposite electrode, a plurality of photo detectors, each provided corresponding to each of the pixel electrodes, said photo detectors being ones in which an electric charge retained therein beforehand is discharged by receiving a reflected light from an original picture and thereby a quantity of the reflected light is detected, a color filter having a display field transmitting a light of a predetermined color and an illumination field transmitting a light of any color, said display field and said illumination field being provided corresponding to each pixel, and a plurality of back light sources, each emitting a monochromatic light of one of the colors selected from red, green, and blue, and emitting a light of white color when said back light sources are lit simultaneously, said method comprising the steps of:

displaying a color picture wherein a liquid crystal in a portion corresponding to said illumination field of said color filter blocks light while a liquid crystal in a portion corresponding to said display field transmits light in response to a picture signal, and all of said back light sources are lit to yield an additive color mixture of the colors of the lights being transmitted through said display field of said color filter, whereby a multi-color picture is produced; and reading a color picture wherein (a) said liquid crystal in a portion corresponding to said display field in said color filter blocks light in all the pixels while said liquid crystal in a portion corresponding to said illumination field transmits light through a single pixel at a time or through a set of pixels not adjacent to each other at a time, (b) said photo detectors are made to retain an electric charge for a single pixel at a time or for a set of pixels not adjacent to each other at a time, (c) each of said back light sources is selectively lit so that the original picture is irradiated with one of said monochromatic lights in sequence through said illumination field in said color filter, and (d) a quantity of each monochromatic light reflected from said original picture is detected by each of said photo detectors, whereby a multi-color picture is read.

* * * * *